United States Patent
Barday et al.

(10) Patent No.: US 10,445,526 B2
(45) Date of Patent: *Oct. 15, 2019

(54) DATA PROCESSING SYSTEMS FOR MEASURING PRIVACY MATURITY WITHIN AN ORGANIZATION

(71) Applicant: OneTrust, LLC, Atlanta, GA (US)

(72) Inventors: Kabir A. Barday, Atlanta, GA (US); Jonathan Blake Brannon, Smyrna, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,454

(22) Filed: Mar. 25, 2019

(65) Prior Publication Data
US 2019/0220623 A1    Jul. 18, 2019

Related U.S. Application Data

(63) Continuation of application No. 16/042,642, filed on Jul. 23, 2018, now Pat. No. 10,242,228, which is a (Continued)

(51) Int. Cl.
*G06F 21/62* (2013.01)
*G06F 21/54* (2013.01)
(Continued)

(52) U.S. Cl.
CPC .......... *G06F 21/6245* (2013.01); *G06F 21/54* (2013.01); *G06F 21/577* (2013.01);
(Continued)

(58) Field of Classification Search
CPC .... G06F 21/6245; G06F 21/54; G06F 21/577; G06F 3/04842; G06F 2221/2101; H04L 63/04; H04L 63/20
See application file for complete search history.

(56) References Cited

U.S. PATENT DOCUMENTS 5,193,162 A   3/1993   Bordsen et al.
5,276,735 A   1/1994   Boebert et al.
(Continued)

FOREIGN PATENT DOCUMENTS

EP   1394698   3/2004
EP   2031540   3/2009
(Continued)

OTHER PUBLICATIONS

Berezovskiy et al, "A framework for dynamic data source identification and orchestration on the Web", ACM, pp. 1-8 (Year: 2010).

(Continued)

*Primary Examiner* — Sharon S Lynch
(74) *Attorney, Agent, or Firm* — Brient IP Law, LLC

(57) ABSTRACT

A privacy compliance measurement system, according to particular embodiments, is configured to determine compliance with one or more privacy compliance requirements by an organization or sub-group of the organization. In various embodiments, the system is configured to determine a privacy maturity rating for each of a plurality of sub-groups within an organization. In some embodiments, the privacy maturity rating is based at least in part on: (1) a frequency of risks or issues identified with Privacy Impact Assessments (PIAs) performed or completed by the one or sub-groups; (2) a relative training level of members of the sub-groups with regard to privacy related matters; (3) a breadth and amount of personal data collected by the sub-groups; and/or (4) etc. In various embodiments, the system is configured to automatically modify one or more privacy campaigns based on the determined privacy maturity ratings.

19 Claims, 13 Drawing Sheets

Related U.S. Application Data continuation-in-part of application No. 15/619,251, filed on Jun. 9, 2017, now Pat. No. 10,032,172, which is a continuation-in-part of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016.

(51) Int. Cl.
*H04L 29/06* (2006.01)
*G06F 21/57* (2013.01)
*G06F 3/0484* (2013.01)
*G06Q 50/00* (2012.01)

(52) U.S. Cl.
CPC .............. *H04L 63/04* (2013.01); *H04L 63/20* (2013.01); *G06F 3/04842* (2013.01); *G06F 2221/2101* (2013.01); *G06Q 50/01* (2013.01)

(56) References Cited

U.S. PATENT DOCUMENTS

| | | | |
|---|---|---|---|
| 5,535,393 A | 7/1996 | Reeve et al. | |
| 5,560,005 A | 9/1996 | Hoover et al. | |
| 6,122,627 A | 9/2000 | Carey et al. | |
| 6,148,342 A | 11/2000 | Ho | |
| 6,253,203 B1 | 6/2001 | Oflaherty et al. | |
| 6,272,631 B1 | 8/2001 | Thomlinson et al. | |
| 6,275,824 B1 | 8/2001 | Oflaherty et al. | |
| 6,374,252 B1 | 4/2002 | Althoff et al. | |
| 6,442,688 B1 | 8/2002 | Moses et al. | |
| 6,606,744 B1 | 8/2003 | Mikurak | |
| 6,611,812 B2 | 8/2003 | Hurtado et al. | |
| 6,625,602 B1 | 9/2003 | Meredith et al. | |
| 6,662,192 B1 | 12/2003 | Rebane | |
| 6,757,888 B1 | 6/2004 | Knutson et al. | |
| 6,816,944 B2 | 11/2004 | Peng | |
| 6,826,693 B1 | 11/2004 | Yoshida et al. | |
| 6,904,417 B2 | 6/2005 | Clayton et al. | |
| 6,925,443 B1 | 8/2005 | Baggett, Jr. et al. | |
| 6,938,041 B1 | 8/2005 | Brandow et al. | |
| 6,983,221 B2 * | 1/2006 | Tracy .................. G06F 21/577 702/108 | |
| 6,985,887 B1 | 1/2006 | Sunstein et al. | |
| 6,993,495 B2 | 1/2006 | Smith, Jr. et al. | |
| 7,013,290 B2 | 3/2006 | Ananian | |
| 7,017,105 B2 | 3/2006 | Flanagin et al. | |
| 7,039,654 B1 | 5/2006 | Eder | |
| 7,047,517 B1 | 5/2006 | Brown et al. | |
| 7,051,036 B2 | 5/2006 | Rosnow et al. | |
| 7,069,427 B2 | 6/2006 | Adler et al. | |
| 7,127,741 B2 | 10/2006 | Bandini et al. | |
| 7,139,999 B2 | 11/2006 | Bowman-Amuah | |
| 7,171,379 B2 | 1/2007 | Menninger et al. | |
| 7,181,438 B1 | 2/2007 | Szabo | |
| 7,203,929 B1 | 4/2007 | Vinodkrishnan et al. | |
| 7,213,233 B1 | 5/2007 | Vinodkrishnan et al. | |
| 7,216,340 B1 | 5/2007 | Vinodkrishnan et al. | |
| 7,223,234 B2 | 5/2007 | Stupp et al. | |
| 7,234,065 B2 | 6/2007 | Breslin et al. | |
| 7,251,624 B1 | 7/2007 | Lee et al. | |
| 7,260,830 B2 | 8/2007 | Sugimoto | |
| 7,287,280 B2 | 10/2007 | Young | |
| 7,313,575 B2 | 12/2007 | Carr et al. | |
| 7,313,699 B2 | 12/2007 | Koga | |
| 7,353,204 B2 | 4/2008 | Liu | |
| 7,370,025 B1 | 5/2008 | Pandit | |
| 7,391,854 B2 | 6/2008 | Salonen et al. | |
| 7,401,235 B2 | 7/2008 | Mowers et al. | |
| 7,403,942 B1 | 7/2008 | Bayliss | |
| 7,412,402 B2 | 8/2008 | Cooper | |
| 7,478,157 B2 | 1/2009 | Bohrer et al. | |
| 7,512,987 B2 | 3/2009 | Williams | |
| 7,516,882 B2 | 4/2009 | Cucinotta | |
| 7,523,053 B2 | 4/2009 | Pudhukottai et al. | |
| 7,548,968 B1 | 6/2009 | Bura et al. | |
| 7,552,480 B1 | 6/2009 | Voss | |
| 7,584,505 B2 | 9/2009 | Mondri et al. | |
| 7,590,972 B2 | 9/2009 | Axelrod et al. | |
| 7,603,356 B2 | 10/2009 | Schran et al. | |
| 7,606,790 B2 | 10/2009 | Levy | |
| 7,613,700 B1 | 11/2009 | Lobo et al. | |
| 7,620,644 B2 | 11/2009 | Cote et al. | |
| 7,630,874 B2 | 12/2009 | Fables et al. | |
| 7,630,998 B2 | 12/2009 | Zhou et al. | |
| 7,636,742 B1 | 12/2009 | Olavarrieta et al. | |
| 7,653,592 B1 | 1/2010 | Flaxman et al. | |
| 7,665,073 B2 | 2/2010 | Meijer et al. | |
| 7,668,947 B2 | 2/2010 | Hutchinson et al. | |
| 7,673,282 B2 | 3/2010 | Amaru et al. | |
| 7,685,561 B2 | 3/2010 | Deem et al. | |
| 7,685,577 B2 | 3/2010 | Pace et al. | |
| 7,693,593 B2 | 4/2010 | Ishibashi et al. | |
| 7,707,224 B2 | 4/2010 | Chastagnol et al. | |
| 7,716,242 B2 | 5/2010 | Pae et al. | |
| 7,729,940 B2 | 6/2010 | Harvey et al. | |
| 7,730,142 B2 | 6/2010 | Levasseur et al. | |
| 7,752,124 B2 | 7/2010 | Green et al. | |
| 7,756,987 B2 | 7/2010 | Wang et al. | |
| 7,774,745 B2 | 8/2010 | Fildebrandt et al. | |
| 7,788,212 B2 | 8/2010 | Beckmann et al. | |
| 7,788,632 B2 | 8/2010 | Kuester et al. | |
| 7,801,758 B2 | 9/2010 | Gracie et al. | |
| 7,853,468 B2 | 12/2010 | Callahan et al. | |
| 7,853,470 B2 | 12/2010 | Sonnleithner et al. | |
| 7,870,540 B2 | 1/2011 | Zare et al. | |
| 7,870,608 B2 | 1/2011 | Shraim et al. | |
| 7,873,541 B1 | 1/2011 | Klar et al. | |
| 7,877,327 B2 | 1/2011 | Gwiazda et al. | |
| 7,877,812 B2 | 1/2011 | Koved et al. | |
| 7,885,841 B2 | 2/2011 | King | |
| 7,917,963 B2 | 3/2011 | Goyal et al. | |
| 7,958,494 B2 | 6/2011 | Chaar et al. | |
| 7,966,310 B2 | 6/2011 | Sullivan et al. | |
| 7,966,663 B2 | 6/2011 | Strickland et al. | |
| 7,991,559 B2 | 8/2011 | Dzekunov et al. | |
| 8,019,881 B2 | 9/2011 | Sandhu et al. | |
| 8,032,721 B2 | 10/2011 | Murai | |
| 8,037,409 B2 | 10/2011 | Jacob et al. | |
| 8,041,913 B2 | 10/2011 | Wang | |
| 8,069,161 B2 | 11/2011 | Bugir et al. | |
| 8,146,074 B2 | 3/2012 | Ito et al. | |
| 8,150,717 B2 | 4/2012 | Whitmore | |
| 8,156,158 B2 | 4/2012 | Rolls et al. | |
| 8,176,177 B2 | 5/2012 | Sussman et al. | |
| 8,176,334 B2 | 5/2012 | Vainstein | |
| 8,180,759 B2 | 5/2012 | Hamzy | |
| 8,239,244 B2 | 8/2012 | Ginsberg et al. | |
| 8,250,051 B2 | 8/2012 | Bugir et al. | |
| 8,286,239 B1 | 10/2012 | Sutton | |
| 8,364,713 B2 | 1/2013 | Pollard | |
| 8,381,180 B2 | 2/2013 | Rostoker | |
| 8,418,226 B2 | 4/2013 | Gardner | |
| 8,423,954 B2 | 4/2013 | Ronen et al. | |
| 8,429,597 B2 | 4/2013 | Prigge | |
| 8,429,758 B2 | 4/2013 | Chen et al. | |
| 8,438,644 B2 | 5/2013 | Watters et al. | |
| 8,494,894 B2 | 7/2013 | Jaster et al. | |
| 8,504,481 B2 | 8/2013 | Motahari et al. | |
| 8,516,076 B2 | 8/2013 | Thomas | |
| 8,578,036 B1 | 11/2013 | Holfelder et al. | |
| 8,578,166 B2 | 11/2013 | De Monseignat et al. | |
| 8,578,481 B2 | 11/2013 | Rowley | |
| 8,583,694 B2 | 11/2013 | Siegel et al. | |
| 8,589,183 B2 | 11/2013 | Awaraji et al. | |
| 8,601,591 B2 | 12/2013 | Krishnamurthy et al. | |
| 8,612,420 B2 | 12/2013 | Sun et al. | |
| 8,612,993 B2 | 12/2013 | Grant et al. | |
| 8,620,952 B2 | 12/2013 | Bennett et al. | |
| 8,621,637 B2 | 12/2013 | Al-Harbi et al. | |

(56) References Cited

U.S. PATENT DOCUMENTS

| | | | |
|---|---|---|---|
| 8,627,114 | B2 | 1/2014 | Resch et al. |
| 8,640,110 | B2 | 1/2014 | Kopp et al. |
| 8,681,984 | B2 | 3/2014 | Lee et al. |
| 8,683,502 | B2 | 3/2014 | Shkedi et al. |
| 8,688,601 | B2 | 4/2014 | Jaiswal |
| 8,706,742 | B1 | 4/2014 | Ravid et al. |
| 8,712,813 | B2 | 4/2014 | King |
| 8,744,894 | B2* | 6/2014 | Christiansen .......... G06Q 10/06 705/7.28 |
| 8,763,071 | B2 | 6/2014 | Sinha et al. |
| 8,767,947 | B1 | 7/2014 | Ristock et al. |
| 8,805,707 | B2 | 8/2014 | Schumann, Jr. et al. |
| 8,805,925 | B2 | 8/2014 | Price et al. |
| 8,812,342 | B2 | 8/2014 | Barcelo et al. |
| 8,819,253 | B2 | 8/2014 | Simeloff et al. |
| 8,819,617 | B1 | 8/2014 | Koenig et al. |
| 8,826,446 | B1 | 9/2014 | Liu et al. |
| 8,839,232 | B2 | 9/2014 | Taylor et al. |
| 8,843,487 | B2 | 9/2014 | McGraw et al. |
| 8,893,286 | B1 | 11/2014 | Oliver |
| 8,914,263 | B2 | 12/2014 | Shimada et al. |
| 8,914,299 | B2 | 12/2014 | Pesci-Anderson |
| 8,914,342 | B2 | 12/2014 | Kalaboukis et al. |
| 8,918,392 | B1 | 12/2014 | Brooker et al. |
| 8,918,632 | B1* | 12/2014 | Sartor ................. G06F 21/53 713/152 |
| 8,930,896 | B1 | 1/2015 | Wiggins |
| 8,935,266 | B2 | 1/2015 | Wu |
| 8,935,804 | B1 | 1/2015 | Clark et al. |
| 8,943,076 | B2 | 1/2015 | Stewart et al. |
| 8,959,584 | B2 | 2/2015 | Piliouras |
| 8,966,575 | B1 | 2/2015 | McQuay et al. |
| 8,977,234 | B2 | 3/2015 | Chava |
| 8,983,972 | B2 | 3/2015 | Kriebel et al. |
| 8,990,933 | B1 | 3/2015 | Magdalin |
| 8,997,213 | B2 | 3/2015 | Papakipos et al. |
| 9,003,295 | B2 | 4/2015 | Baschy |
| 9,043,217 | B2 | 5/2015 | Cashman et al. |
| 9,047,463 | B2 | 6/2015 | Porras |
| 9,047,582 | B2 | 6/2015 | Hutchinson et al. |
| 9,069,940 | B2 | 6/2015 | Hars |
| 9,092,796 | B2 | 7/2015 | Eversoll et al. |
| 9,094,434 | B2 | 7/2015 | Williams et al. |
| 9,098,515 | B2 | 8/2015 | Richter et al. |
| 9,100,778 | B2 | 8/2015 | Stogaitis et al. |
| 9,111,295 | B2 | 8/2015 | Tietzen et al. |
| 9,129,311 | B2 | 9/2015 | Schoen et al. |
| 9,135,261 | B2 | 9/2015 | Maunder et al. |
| 9,152,820 | B1 | 10/2015 | Pauley, Jr. et al. |
| 9,158,655 | B2 | 10/2015 | Wadhwani et al. |
| 9,172,706 | B2 | 10/2015 | Krishnamurthy et al. |
| 9,178,901 | B2 | 11/2015 | Xue et al. |
| 9,202,085 | B2 | 12/2015 | Mawdsley et al. |
| 9,215,252 | B2 | 12/2015 | Smith et al. |
| 9,232,040 | B2 | 1/2016 | Barash et al. |
| 9,235,476 | B2 | 1/2016 | McHugh et al. |
| 9,241,259 | B2 | 1/2016 | Daniela et al. |
| 9,245,126 | B2 | 1/2016 | Christodorescu et al. |
| 9,286,282 | B2 | 3/2016 | Ling, III et al. |
| 9,288,118 | B1 | 3/2016 | Pattan |
| 9,317,715 | B2 | 4/2016 | Schuette et al. |
| 9,336,332 | B2 | 5/2016 | Davis et al. |
| 9,336,400 | B2 | 5/2016 | Milman et al. |
| 9,338,188 | B1 | 5/2016 | Ahn |
| 9,344,424 | B2 | 5/2016 | Tenenboym et al. |
| 9,348,802 | B2 | 5/2016 | Massand |
| 9,355,157 | B2 | 5/2016 | Mohammed et al. |
| 9,356,961 | B1* | 5/2016 | Todd ................... H04L 63/1441 |
| 9,369,488 | B2 | 6/2016 | Woods et al. |
| 9,384,199 | B2 | 7/2016 | Thereska et al. |
| 9,384,357 | B2 | 7/2016 | Patil et al. |
| 9,386,104 | B2 | 7/2016 | Adams et al. |
| 9,396,332 | B2 | 7/2016 | Abrams et al. |
| 9,401,900 | B2 | 7/2016 | Levasseur et al. |
| 9,411,982 | B1 | 8/2016 | Dippenaar et al. |
| 9,424,021 | B2 | 8/2016 | Zamir |
| 9,462,009 | B1 | 10/2016 | Kolman et al. |
| 9,465,800 | B2 | 10/2016 | Lacey |
| 9,477,523 | B1 | 10/2016 | Warman et al. |
| 9,477,660 | B2 | 10/2016 | Scott et al. |
| 9,477,942 | B2 | 10/2016 | Adachi et al. |
| 9,483,659 | B2 | 11/2016 | Bao et al. |
| 9,507,960 | B2 | 11/2016 | Bell et al. |
| 9,521,166 | B2 | 12/2016 | Wilson |
| 9,549,047 | B1 | 1/2017 | Fredinburg et al. |
| 9,552,395 | B2 | 1/2017 | Bayer et al. |
| 9,558,497 | B2 | 1/2017 | Carvalho |
| 9,571,509 | B1 | 2/2017 | Satish et al. |
| 9,602,529 | B2 | 3/2017 | Jones et al. |
| 9,619,661 | B1 | 4/2017 | Finkelstein |
| 9,621,357 | B2 | 4/2017 | Williams et al. |
| 9,621,566 | B2 | 4/2017 | Gupta et al. |
| 9,646,095 | B1 | 5/2017 | Gottlieb et al. |
| 9,648,036 | B2 | 5/2017 | Seiver et al. |
| 9,652,314 | B2 | 5/2017 | Mahiddini |
| 9,654,541 | B1 | 5/2017 | Kapczynski et al. |
| 9,665,722 | B2 | 5/2017 | Nagasundaram et al. |
| 9,672,053 | B2 | 6/2017 | Tang et al. |
| 9,691,090 | B1 | 6/2017 | Barday |
| 9,721,078 | B2 | 8/2017 | Cornick et al. |
| 9,721,108 | B2 | 8/2017 | Krishnamurthy et al. |
| 9,729,583 | B1 | 8/2017 | Barday |
| 9,740,985 | B2 | 8/2017 | Byron et al. |
| 9,740,987 | B2 | 8/2017 | Dolan |
| 9,749,408 | B2 | 8/2017 | Subramani et al. |
| 9,760,620 | B2 | 9/2017 | Nachnani et al. |
| 9,760,697 | B1 | 9/2017 | Walker |
| 9,762,553 | B2 | 9/2017 | Ford et al. |
| 9,767,309 | B1 | 9/2017 | Patel et al. |
| 9,785,795 | B2 | 10/2017 | Grondin et al. |
| 9,798,749 | B2 | 10/2017 | Saner |
| 9,800,605 | B2* | 10/2017 | Baikalov ............ H04L 63/1408 |
| 9,804,928 | B2 | 10/2017 | Davis et al. |
| 9,811,532 | B2 | 11/2017 | Parkison et al. |
| 9,817,850 | B2 | 11/2017 | Dubbels et al. |
| 9,817,978 | B2 | 11/2017 | Marsh et al. |
| 9,838,407 | B1 | 12/2017 | Oprea et al. |
| 9,838,839 | B2 | 12/2017 | Vudali et al. |
| 9,842,349 | B2 | 12/2017 | Sawczuk et al. |
| 9,852,150 | B2 | 12/2017 | Sharpe et al. |
| 9,877,138 | B1 | 1/2018 | Franklin |
| 9,882,935 | B2 | 1/2018 | Barday |
| 9,892,441 | B2 | 2/2018 | Barday |
| 9,892,442 | B2 | 2/2018 | Barday |
| 9,892,443 | B2 | 2/2018 | Barday |
| 9,892,444 | B2 | 2/2018 | Barday |
| 9,898,769 | B2 | 2/2018 | Barday |
| 9,912,625 | B2 | 3/2018 | Mutha et al. |
| 9,916,703 | B2 | 3/2018 | Douillard et al. |
| 9,923,927 | B1 | 3/2018 | McClintock et al. |
| 9,953,189 | B2 | 4/2018 | Cook et al. |
| 9,961,070 | B2 | 5/2018 | Tang |
| 9,983,936 | B2 | 5/2018 | Dornemann et al. |
| 9,992,213 | B2 | 6/2018 | Sinnema |
| 10,001,975 | B2 | 6/2018 | Bharthulwar |
| 10,002,064 | B2 | 6/2018 | Muske |
| 10,013,577 | B1 | 7/2018 | Beaumont et al. |
| 10,015,164 | B2 | 7/2018 | Hamburg et al. |
| 10,019,339 | B2 | 7/2018 | Von Hanxleden et al. |
| 10,025,804 | B2 | 7/2018 | Vranyes et al. |
| 10,044,761 | B2 | 8/2018 | Ducatel et al. |
| 10,055,426 | B2 | 8/2018 | Arasan et al. |
| 10,061,847 | B2 | 8/2018 | Mohammed et al. |
| 10,073,924 | B2 | 9/2018 | Karp et al. |
| 10,075,451 | B1 | 9/2018 | Hall et al. |
| 10,102,533 | B2 | 10/2018 | Barday |
| 10,122,760 | B2 | 11/2018 | Terrill et al. |
| 10,158,676 | B2 | 12/2018 | Barday |
| 10,165,011 | B2 | 12/2018 | Barday |
| 10,181,043 | B1* | 1/2019 | Pauley, Jr. ............ H04L 63/04 |
| 10,181,051 | B2 | 1/2019 | Barday et al. |
| 10,250,594 | B2 | 4/2019 | Chathoth |
| 10,284,604 | B2 | 5/2019 | Barday et al. |
| 10,289,867 | B2 | 5/2019 | Barday et al. |

(56) References Cited

U.S. PATENT DOCUMENTS

| | | |
|---|---|---|
| 2002/0042687 A1* | 4/2002 | Tracy .................... G06F 21/577 702/119 |
| 2002/0069035 A1* | 6/2002 | Tracy .................... G06Q 30/018 702/181 |
| 2002/0161594 A1 | 10/2002 | Bryan et al. |
| 2003/0041250 A1 | 2/2003 | Proudler |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0131093 A1 | 7/2003 | Aschen et al. |
| 2003/0163728 A1* | 8/2003 | Shaw .................. H04L 63/0209 726/12 |
| 2004/0010709 A1* | 1/2004 | Baudoin ................ G06Q 40/08 726/25 |
| 2004/0088235 A1 | 5/2004 | Ziekle et al. |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0114343 A1 | 5/2005 | Wesinger, Jr. et al. |
| 2005/0144066 A1 | 6/2005 | Cope et al. |
| 2005/0197884 A1 | 9/2005 | Mullen, Jr. |
| 2006/0031078 A1 | 2/2006 | Pizzinger et al. |
| 2006/0075122 A1 | 4/2006 | Lindskog et al. |
| 2006/0149730 A1 | 7/2006 | Curtis |
| 2007/0027715 A1 | 2/2007 | Gropper et al. |
| 2007/0130101 A1 | 6/2007 | Anderson et al. |
| 2007/0157311 A1 | 7/2007 | Meier et al. |
| 2007/0179793 A1 | 8/2007 | Bagchi et al. |
| 2007/0180490 A1 | 8/2007 | Renzi et al. |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028435 A1 | 1/2008 | Strickland et al. |
| 2008/0047016 A1* | 2/2008 | Spoonamore ......... G06F 21/577 726/25 |
| 2008/0120699 A1 | 5/2008 | Spear |
| 2008/0270203 A1 | 10/2008 | Holmes et al. |
| 2008/0282320 A1 | 11/2008 | Denovo et al. |
| 2008/0288271 A1 | 11/2008 | Faust |
| 2009/0037975 A1 | 2/2009 | Ishikawa et al. |
| 2009/0182818 A1 | 7/2009 | Krywaniuk |
| 2009/0204452 A1 | 8/2009 | Iskandar et al. |
| 2009/0216610 A1 | 8/2009 | Chorny |
| 2009/0249076 A1 | 10/2009 | Reed et al. |
| 2009/0254511 A1* | 10/2009 | Yeap .................... G06F 21/6245 |
| 2009/0303237 A1* | 12/2009 | Liu ..................... H04L 63/0414 345/440 |
| 2010/0100398 A1 | 4/2010 | Auker et al. |
| 2010/0114634 A1* | 5/2010 | Christiansen .......... G06Q 10/06 705/7.28 |
| 2010/0121773 A1* | 5/2010 | Currier ................. G06F 21/577 705/347 |
| 2010/0192201 A1 | 7/2010 | Shimoni et al. |
| 2010/0205057 A1 | 8/2010 | Hook et al. |
| 2010/0228786 A1 | 9/2010 | Török |
| 2010/0235915 A1 | 9/2010 | Memon et al. |
| 2010/0268628 A1 | 10/2010 | Pitkow et al. |
| 2010/0281313 A1 | 11/2010 | White et al. |
| 2010/0333012 A1 | 12/2010 | Adachi et al. |
| 2011/0010202 A1 | 1/2011 | Neale |
| 2011/0137696 A1 | 6/2011 | Meyer et al. |
| 2011/0231896 A1 | 9/2011 | Tovar |
| 2012/0084349 A1 | 4/2012 | Lee et al. |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0143650 A1 | 6/2012 | Crowley et al. |
| 2012/0144499 A1 | 6/2012 | Tan et al. |
| 2012/0259752 A1 | 10/2012 | Agee |
| 2013/0018954 A1 | 1/2013 | Cheng |
| 2013/0085801 A1 | 4/2013 | Sharpe et al. |
| 2013/0103485 A1 | 4/2013 | Postrel |
| 2013/0111323 A1 | 5/2013 | Taghaddos et al. |
| 2013/0218829 A1 | 8/2013 | Martinez |
| 2013/0311224 A1 | 11/2013 | Heroux et al. |
| 2013/0326112 A1 | 12/2013 | Park et al. |
| 2013/0332362 A1 | 12/2013 | Ciurea |
| 2013/0340086 A1 | 12/2013 | Blom |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0047551 A1* | 2/2014 | Nagasundaram ....... G06F 21/60 726/26 |
| 2014/0052463 A1 | 2/2014 | Cashman et al. |
| 2014/0074645 A1 | 3/2014 | Ingram |
| 2014/0089027 A1 | 3/2014 | Brown |
| 2014/0089039 A1 | 3/2014 | McClellan |
| 2014/0143011 A1 | 5/2014 | Mudugu et al. |
| 2014/0208418 A1 | 7/2014 | Libin |
| 2014/0244309 A1 | 8/2014 | Francois |
| 2014/0244325 A1 | 8/2014 | Cartwright |
| 2014/0244399 A1 | 8/2014 | Orduna et al. |
| 2014/0278663 A1 | 9/2014 | Samuel et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289862 A1 | 9/2014 | Gorfein et al. |
| 2014/0337466 A1 | 11/2014 | Li et al. |
| 2014/0344015 A1 | 11/2014 | Puértolas-Montañés et al. |
| 2015/0019530 A1 | 1/2015 | Felch |
| 2015/0066577 A1 | 3/2015 | Christiansen et al. |
| 2015/0106867 A1 | 4/2015 | Liang |
| 2015/0106948 A1 | 4/2015 | Holman et al. |
| 2015/0106949 A1 | 4/2015 | Holman et al. |
| 2015/0169318 A1 | 6/2015 | Nash |
| 2015/0178740 A1 | 6/2015 | Borawski et al. |
| 2015/0207819 A1* | 7/2015 | Sartor .................... G06F 21/53 726/1 |
| 2015/0229664 A1 | 8/2015 | Hawthorn et al. |
| 2015/0235050 A1* | 8/2015 | Wouhaybi ............ G06F 21/604 726/28 |
| 2015/0242778 A1 | 8/2015 | Wilcox et al. |
| 2015/0254597 A1 | 9/2015 | Jahagirdar |
| 2015/0261887 A1 | 9/2015 | Joukov |
| 2015/0269384 A1 | 9/2015 | Holman et al. |
| 2015/0310575 A1 | 10/2015 | Shelton |
| 2015/0356362 A1 | 12/2015 | Demos |
| 2015/0379430 A1 | 12/2015 | Dirac et al. |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0099963 A1 | 4/2016 | Mahaffey et al. |
| 2016/0103963 A1 | 4/2016 | Mishra |
| 2016/0125751 A1 | 5/2016 | Barker et al. |
| 2016/0142445 A1* | 5/2016 | Sartor .................... G06F 21/53 726/1 |
| 2016/0148143 A1 | 5/2016 | Anderson et al. |
| 2016/0162269 A1 | 6/2016 | Pogorelik et al. |
| 2016/0164915 A1* | 6/2016 | Cook .................... H04L 63/04 726/1 |
| 2016/0188450 A1 | 6/2016 | Appusamy et al. |
| 2016/0226905 A1* | 8/2016 | Baikalov ............. H04L 63/1408 |
| 2016/0234319 A1 | 8/2016 | Griffin |
| 2016/0262163 A1 | 9/2016 | Gonzalez Garrido et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0111395 A1* | 4/2017 | Sartor .................... G06F 21/53 |
| 2017/0115864 A1 | 4/2017 | Thomas et al. |

(56) References Cited

U.S. PATENT DOCUMENTS

| | | | |
|---|---|---|---|
| 2017/0124570 A1 | 5/2017 | Nidamanuri et al. | |
| 2017/0140174 A1* | 5/2017 | Lacey | G06F 21/6245 |
| 2017/0142158 A1 | 5/2017 | Laoutaris et al. | |
| 2017/0161520 A1 | 6/2017 | Lockhart, III et al. | |
| 2017/0171235 A1 | 6/2017 | Mulchandani et al. | |
| 2017/0177324 A1 | 6/2017 | Frank et al. | |
| 2017/0180505 A1 | 6/2017 | Shaw et al. | |
| 2017/0193624 A1 | 7/2017 | Tsai | |
| 2017/0201518 A1 | 7/2017 | Holmqvist et al. | |
| 2017/0206707 A1 | 7/2017 | Guay et al. | |
| 2017/0208084 A1 | 7/2017 | Steelman et al. | |
| 2017/0220964 A1 | 8/2017 | Datta | |
| 2017/0249710 A1 | 8/2017 | Guillama et al. | |
| 2017/0270318 A1 | 9/2017 | Ritchie | |
| 2017/0278117 A1 | 9/2017 | Wallace et al. | |
| 2017/0286719 A1 | 10/2017 | Krishnamurthy et al. | |
| 2017/0287031 A1 | 10/2017 | Barday | |
| 2017/0308875 A1 | 10/2017 | O'Regan et al. | |
| 2017/0330197 A1 | 11/2017 | DiMaggio et al. | |
| 2017/0357982 A1* | 12/2017 | Barday | H04W 12/02 |
| 2018/0063174 A1 | 3/2018 | Grill et al. | |
| 2018/0063190 A1 | 3/2018 | Wright et al. | |
| 2018/0083843 A1* | 3/2018 | Sambandam | H04L 41/5009 |
| 2018/0091476 A1 | 3/2018 | Jakobsson et al. | |
| 2018/0165637 A1 | 6/2018 | Romero et al. | |
| 2018/0182009 A1* | 6/2018 | Barday | G06Q 30/0609 |
| 2018/0198614 A1 | 7/2018 | Neumann | |
| 2018/0248914 A1* | 8/2018 | Sartor | G06F 21/53 |
| 2018/0285887 A1 | 10/2018 | Maung | |
| 2018/0307859 A1* | 10/2018 | LaFever | H04L 63/0407 |
| 2018/0374030 A1 | 12/2018 | Barday et al. | |

FOREIGN PATENT DOCUMENTS

| | | |
|---|---|---|
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

McGarth et al, "Digital Library Technology for Locating and Accessing Scientific Data", ACM, pp. 188-194 (Year: 1999).

Mudepalli et al, "An efficient data retrieval approach using blowfish encryption on cloud CipherText Retrieval in Cloud Computing" IEEE, pp. 267-271 (Year: 2017).

Notice of Allowance, dated Jul. 10, 2019, from corresponding U.S. Appl. No. 16/237,083.

Notice of Allowance, dated Jul. 10, 2019, from corresponding U.S. Appl. No. 16/403,358.

Notice of Allowance, dated Jul. 12, 2019, from corresponding U.S. Appl. No. 16/278,121.

Office Action, dated Jun. 27, 2019, from corresponding U.S. Appl. No. 16/404,405.

Salim et al, "Data Retrieval and Security using Lightweight Directory Access Protocol", IEEE, pp. 685-688 (Year: 2009).

Stern, Joanna, "iPhone Privacy Is Broken . . . and Apps Are to Blame", The Wall Street Journal, wsj.com, May 31, 2019.

Notice of Allowance, dated Jul. 17, 2019, from corresponding U.S. Appl. No. 16/055,961.

Office Action, dated Jul. 18, 2019, from corresponding U.S. Appl. No. 16/410,762.

International Search Report, dated Oct. 12, 2018, from corresponding International Application No. PCT/US2018/044046.

International Search Report, dated Oct. 16, 2018, from corresponding International Application No. PCT/US2018/045243.

International Search Report, dated Oct. 18, 2018, from corresponding International Application No. PCT/US2018/045249.

International Search Report, dated Oct. 20, 2017, from corresponding International Application No. PCT/US2017/036917.

International Search Report, dated Oct. 3, 2017, from corresponding International Application No. PCT/US2017/036912.

International Search Report, dated Sep. 1, 2017, from corresponding International Application No. PCT/US2017/036896.

International Search Report, dated Sep. 12, 2018, from corresponding International Application No. PCT/US2018/037504.

Invitation to Pay Additional Search Fees, dated Aug. 10, 2017, from corresponding International Application No. PCT/US2017/036912.

Invitation to Pay Additional Search Fees, dated Aug. 10, 2017, from corresponding International Application No. PCT/US2017/036917.

Invitation to Pay Additional Search Fees, dated Aug. 24, 2017, from corresponding International Application No. PCT/US2017/036888.

Invitation to Pay Additional Search Fees, dated Jan. 18, 2019, from corresponding International Application No. PCT/US2018/055736.

Invitation to Pay Additional Search Fees, dated Jan. 7, 2019, from corresponding International Application No. PCT/US2018/055773.

Invitation to Pay Additional Search Fees, dated Jan. 8, 2019, from corresponding International Application No. PCT/US2018/055774.

Invitation to Pay Additional Search Fees, dated Oct. 23, 2018, from corresponding International Application No. PCT/US2018/045296.

Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.

Krol, Kat, et al, Control versus Effort in Privacy Warnings for Webforms, ACM, Oct. 24, 2016, pp. 13-23.

Lamb et al, "Role-Based Access Control for Data Service Integration", ACM, pp. 3-11 (Year: 2006).

Li, Ninghui, et al, t-Closeness: Privacy Beyond k-Anonymity and l-Diversity, IEEE, 2014, p. 106-115.

Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.

Maret et al, "Multimedia Information Interchange: Web Forms Meet Data Servers", IEEE, pp. 499-505 (Year: 1999).

Newman, "Email Archive Overviews using Subject Indexes", ACM, pp. 652-653, 2002 (Year: 2002).

Notice of Allowance, dated Apr. 12, 2017, from corresponding U.S. Appl. No. 15/256,419.

Notice of Allowance, dated Apr. 2, 2019, from corresponding U.S. Appl. No. 16/160,577.

Notice of Allowance, dated Apr. 25, 2018, from corresponding U.S. Appl. No. 15/883,041.

Notice of Allowance, dated Aug. 14, 2018, from corresponding U.S. Appl. No. 15/989,416.

Notice of Allowance, dated Aug. 18, 2017, from corresponding U.S. Appl. No. 15/619,455.

Notice of Allowance, dated Aug. 24, 2018, from corresponding U.S. Appl. No. 15/619,479.

Notice of Allowance, dated Aug. 30, 2018, from corresponding U.S. Appl. No. 15/996,208.

Notice of Allowance, dated Aug. 9, 2018, from corresponding U.S. Appl. No. 15/882,989.

Notice of Allowance, dated Dec. 10, 2018, from corresponding U.S. Appl. No. 16/105,602.

Notice of Allowance, dated Dec. 12, 2017, from corresponding U.S. Appl. No. 15/169,643.

Notice of Allowance, dated Dec. 12, 2017, from corresponding U.S. Appl. No. 15/619,212.

Notice of Allowance, dated Dec. 12, 2017, from corresponding U.S. Appl. No. 15/619,382.

Notice of Allowance, dated Dec. 31, 2018, from corresponding U.S. Appl. No. 16/159,634.

Notice of Allowance, dated Dec. 5, 2017, from corresponding U.S. Appl. No. 15/633,703.

Notice of Allowance, dated Dec. 6, 2017, from corresponding U.S. Appl. No. 15/619,451.

Notice of Allowance, dated Dec. 6, 2017, from corresponding U.S. Appl. No. 15/619,459.

Notice of Allowance, dated Feb. 13, 2019, from corresponding U.S. Appl. No. 16/041,563.

Notice of Allowance, dated Feb. 14, 2019, from corresponding U.S. Appl. No. 16/226,272.

(56) References Cited

OTHER PUBLICATIONS

Notice of Allowance, dated Feb. 19, 2019, from corresponding U.S. Appl. No. 16/159,632.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated Jun. 19, 2018, from corresponding U.S. Appl. No. 15/894,890.
Notice of Allowance, dated Jun. 27, 2018, from corresponding U.S. Appl. No. 15/882,989.
Notice of Allowance, dated Jun. 6, 2018, from corresponding U.S. Appl. No. 15/875,570.
Notice of Allowance, dated Mar. 1, 2018, from corresponding U.S. Appl. No. 15/853,674.
Notice of Allowance, dated Jul. 23, 2019, from corresponding U.S. Appl. No. 16/220,978.
Office Action, dated Jul. 23, 2019, from corresponding U.S. Appl. No. 16/436,616.
Notice of Allowance, dated Jul. 26, 2019, from corresponding U.S. Appl. No. 16/409,673.
Notice of Allowance, dated Jul. 31, 2019, from corresponding U.S. Appl. No. 16/221,153.
Agar, Gunes, et al, The Web Never Forgets, Computer and Communications Security, ACM, Nov. 3, 2014, pp. 674-689.
Aghasian, Erfan, et al, Scoring Users' Privacy Disclosure Across Multiple Online Social Networks, IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Antunes et al, "Preserving Digital Data in Heterogeneous Environments", ACM, pp. 345-348, 2009 (Year: 2009).
Avepoint, AvePoint Privacy Impact Assessment 1: User Guide, Cumulative Update 2, Revision E, Feb. 2015, AvePoint, Inc.
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Decision Regarding Institution of Post-Grant Review in Case PGR2018-00056 for U.S. Pat. No. 9,691,090 B1, Oct. 11, 2018.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Mar. 5, 2019, from corresponding U.S. Appl. No. 16/055,961.
Final Office Action, dated Nov. 29, 2017, from corresponding U.S. Appl. No. 15/619,237.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year 2010).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Hacigümüs, Hakan, et al, Executing SQL over Encrypted Data in the Database-Service-Provider Model, ACM, Jun. 4, 2002, pp. 216-227.
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Iapp, Daily Dashboard, PIA Tool Stocked With New Templates for DPI, Infosec, International Association of Privacy Professionals, Apr. 22, 2014.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
Notice of Allowance, dated Mar. 1, 2019, from corresponding U.S. Appl. No. 16/059,911.
Notice of Allowance, dated Mar. 13, 2019, from corresponding U.S. Appl. No. 16/055,083.

(56) References Cited

OTHER PUBLICATIONS

Notice of Allowance, dated Mar. 14, 2019, from corresponding U.S. Appl. No. 16/055,944.
Notice of Allowance, dated Mar. 2, 2018, from corresponding U.S. Appl. No. 15/858,802.
Notice of Allowance, dated Mar. 25, 2019, from corresponding U.S. Appl. No. 16/054,780.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated May 21, 2018, from corresponding U.S. Appl. No. 15/896,790.
Notice of Allowance, dated May 5, 2017, from corresponding U.S. Appl. No. 15/254,901.
Notice of Allowance, dated Nov. 2, 2018, from corresponding U.S. Appl. No. 16/054,762.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Filing Date for Petition for Post-Grant Review of related U.S. Pat. No. 9,691,090 dated Apr. 12, 2018.
Office Action, dated Apr. 18, 2018, from corresponding U.S. Appl. No. 15/894,819.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Feb. 15, 2019, from corresponding U.S. Appl. No. 16/220,899.
Office Action, dated Feb. 26, 2019, from corresponding U.S. Appl. No. 16/228,250.
Office Action, dated Jan. 18, 2019, from corresponding U.S. Appl. No. 16/055,984.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jul. 21, 2017, from corresponding U.S. Appl. No. 15/256,430.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 25, 2019, from corresponding U.S. Appl. No. 16/278,121.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 4, 2019, from corresponding U.S. Appl. No. 16/237,083.
Office Action, dated May 16, 2018, from corresponding U.S. Appl. No. 15/882,989.
Office Action, dated May 2, 2018, from corresponding U.S. Appl. No. 15/894,809.
Office Action, dated Nov. 1, 2017, from corresponding U.S. Appl. No. 15/169,658.
Office Action, dated Nov. 15, 2018, from corresponding U.S. Appl. No. 16/059,911.
Written Opinion of the International Searching Authority, dated Nov. 19, 2018, from corresponding International Application No. PCT/US2018/046939.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
www.truste.com (1), 200150207, Internet Archive Wayback Machine, www.archive.org,2_7_2015.

(56) References Cited

OTHER PUBLICATIONS

Yu, "Using Data from Social Media Websites to Inspire the Design of Assistive Technology", ACM, pp. 1-2 (Year: 2016).
Zhang et al, "Dynamic Topic Modeling for Monitoring Market Competition from Online Text and Image Data", ACM, pp. 1425-1434 (Year: 2015).
Bhargav-Spantzel et al., Receipt Management—Transaction History based Trust Establishment, 2007, ACM, p. 82-91.
Notice of Allowance, dated Apr. 8, 2019, from corresponding U.S. Appl. No. 16/228,250.
Office Action, dated Apr. 5, 2019, from corresponding U.S. Appl. No. 16/278,119.
Restriction Requirement, dated Apr. 10, 2019, from corresponding U.S. Appl. No. 16/277,715.
Notice of Allowance, dated May 28, 2019, from corresponding U.S. Appl. No. 16/277,568.
Office Action, dated May 17, 2019, from corresponding U.S. Appl. No. 16/277,539.
Office Action, dated May 2, 2019, from corresponding U.S. Appl. No. 16/104,628.
Dimou et al, "Machine-Interpretable Dataset and Service Descriptions for Heterogeneous Data Access and Retrieval", ACM, pp. 145-152 (Year: 2015).
Dunkel et al, "Data Organization and Access for Efficient Data Mining", IEEE, pp. 522-529 (Year: 1999).
Office Action, dated Apr. 22, 2019, from corresponding U.S. Appl. No. 16/241,710.
Restriction Requirement, dated Apr. 24, 2019, from corresponding U.S. Appl. No. 16/278,122.
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Notice of Allowance, dated Jun. 12, 2019, from corresponding U.S. Appl. No. 16/278,123.
Notice of Allowance, dated Jun. 18, 2019, from corresponding U.S. Appl. No. 16/410,566.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 21, 2019, from corresponding U.S. Appl. No. 16/404,439.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2019, from corresponding U.S. Appl. No. 16/159,628.
Office Action, dated Jun. 24, 2019, from corresponding U.S. Appl. No. 16/410,336.
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Abdullah et al, "The Mapping Process of Unstructured Data to the Structured Data", ACM, pp. 151-155 (Year: 2013).
Bhuvaneswaran et al, "Redundant Parallel Data Transfer Schemes for the Grid Environment", ACM, pp. 18 (Year: 2006).
Chowdhury et al, "A System Architecture for Subject-Centric Data Sharing", ACM, pp. 1-10 (Year: 2018).
Hacigumus et al, "Executing SQL over Encrypted Data in the Database-Service-Provider Model", ACM, pp. 216-227 (Year: 2002).
Popescu-Zeletin, "The Data Access and Transfer Support in a Local Heterogeneous Network (HMINET)", IEEE, pp. 147-152 (Year: 1979).
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Zhang et al, "Data Transfer Performance Issues for a Web Services Interface to Synchrotron Experiments", ACM, pp. 59-65 (Year: 2007).
Office Action, dated Nov. 23, 2018, from corresponding U.S. Appl. No. 16/042,673.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Olenski, Steve, For Consumers, Data is a Matter of Trust, CMO Network, Apr. 18, 2016, https://www.forbes.com/sites/steveolenski/2016/04/18/for-consumers-data-is-a-matter-of-trust/#2e48496278b3.
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Restriction Requirement, dated Dec. 31, 2018, from corresponding U.S. Appl. No. 15/169,668.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Nov. 21, 2016, from corresponding U.S. Appl. No. 15/254,901.
Restriction Requirement, dated Oct. 17, 2018, from corresponding U.S. Appl. No. 16/055,984.
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Srivastava, Agrima, et al, Measuring Privacy Leaks in Online Social Networks, International Conference on Advances in Computing, Communications and Informatics (ICACCI), 2013.

(56) References Cited

OTHER PUBLICATIONS

Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
The Cookie Collective, Optanon Cookie Policy Generator, The Cookie Collective, Year 2016, http://web.archive.org/web/20160324062743/https:/optanon.com/.
TRUSTe Announces General Availability of Assessment Manager for Enterprises to Streamline Data Privacy Management with Automation, PRNewswire, 20150304.
Weaver et al, "Understanding Information Preview in Mobile Email Processing", ACM, pp. 303-312, 2011 (Year: 2011).
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.

* cited by examiner

FIG. 5

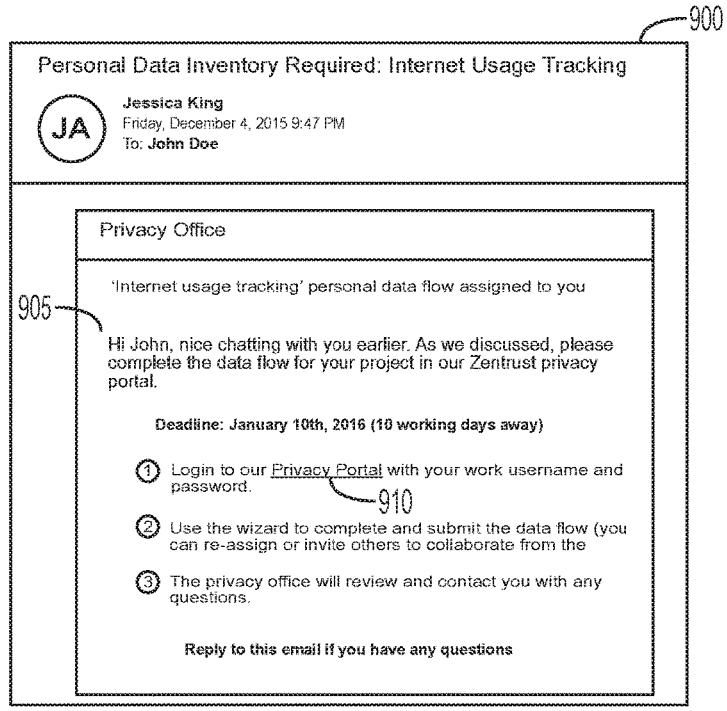
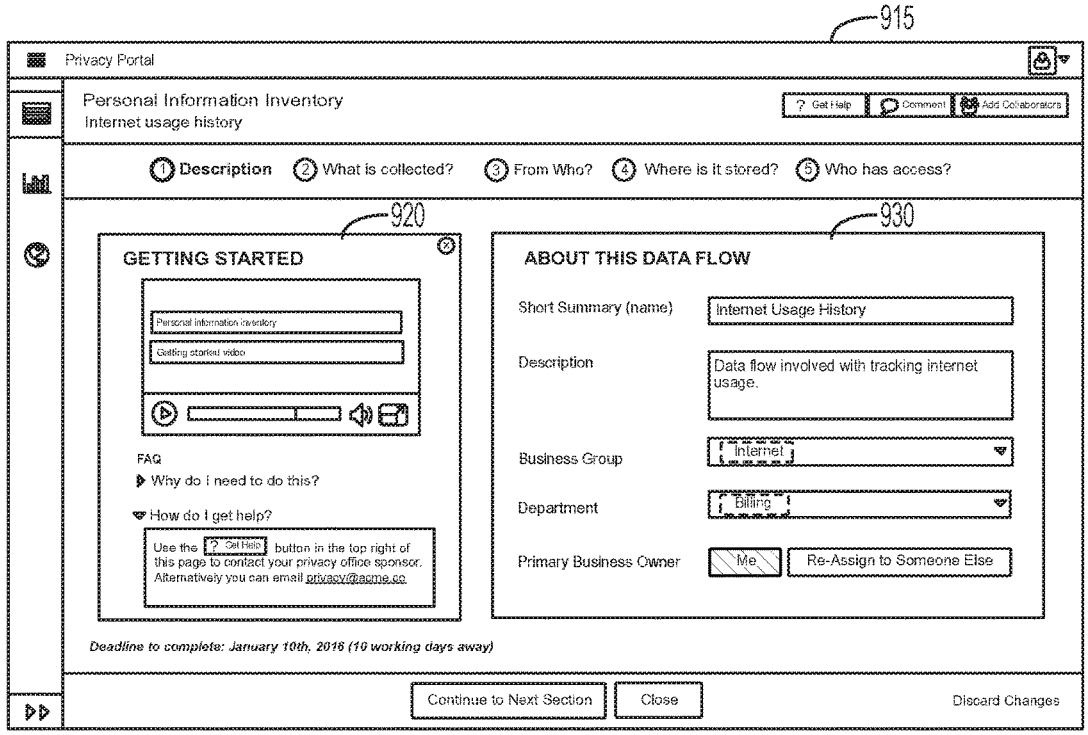
FIG. 6

FIG. 7

Privacy Portal

Personal Information Inventory
Internet usage history

? Get Help   ⌕ Comment   👥 Add Collaborators

① Description   ② What is collected?   ③ From Who?   ④ Where is it stored?   ⑤ Who has access?

Who is it collected from? — 1105

What is the individuals role?   [Employee]  [Customer]  [Other]

Prospect or Current?   [Prospect]  [Current]  [Not Sure]

How is consent given?   [EULA]  [Opt-In Prompt]  [Implied Consent]

Could the individual be a minor/child?   [Always a Minor]  [Never a Minor]  [Age not Known]  [Not Sure]

Where are the individuals located?   [Anywhere we have customers]  [Anywhere globally]  [Specific location]  [Not Sure]

*Deadline to complete: January 10th, 2016 (3 working days away)*

[Save and Continue to Next Section]   [Close]   Discard Changes

Privacy Portal

Privacy Maturity Reports — 1605

| Business Group | Maturity Score | Maturity Score Δ | Action Taken? | More Detail |
|---|---|---|---|---|
| Internet Business Group | 74% | ↑ 8% | No | Click Here |
| Marketing Business Group | 85% | ↑ 22% | Yes | Click Here |
| Social-Media Business Group | 38% | ↓ 23% | Yes | Click Here |
| Accounting Business Group | 92% | ↑ 2% | No | Click Here |
| Technology Business Group | 68% | ↓ 3% | Yes | Click Here |

1610 — Maturity Score
1615 — Maturity Score Δ
1620 — Action Taken?
1625 — More Detail ? Get Help | Comment | Add Collaborators Continue to Next Section | Close Discard Changes

DATA PROCESSING SYSTEMS FOR MEASURING PRIVACY MATURITY WITHIN AN ORGANIZATION

CROSS-REFERENCE TO RELATED APPLICATIONS

This application is a continuation of U.S. patent application Ser. No. 16/042,642, filed Jul. 23, 2018, which is a continuation-in-part of U.S. patent application Ser. No. 15/619,251, filed Jun. 9, 2017, now U.S. Pat. No. 10,032,172, issued Jul. 24, 2018, which is a continuation-in-part of U.S. patent application Ser. No. 15/254,901, filed Sep. 1, 2016, now U.S. Pat. No. 9,729,583, issued Aug. 8, 2017, which claims priority to U.S. Provisional Patent Application Ser. No. 62/360,123, filed Jul. 8, 2016; U.S. Provisional Patent Application Ser. No. 62/353,802, filed Jun. 23, 2016; and U.S. Provisional Patent Application Ser. No. 62/348,695, filed Jun. 10, 2016; the disclosures of all of the above-referenced patent applications are hereby incorporated herein by reference in their entirety.

TECHNICAL FIELD

This disclosure relates to, among other things, data processing systems and methods for retrieving data regarding a plurality of privacy campaigns, using that data to assess a relative risk associated with the respective data privacy campaigns, providing an audit schedule for each campaign, measuring privacy requirement compliance across a plurality of privacy campaigns, determining respective privacy maturity ratings for one or more groups within an organization, and processing the relevant data.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media). While not all personal data may be sensitive, in the wrong hands, this kind of information may have a negative impact on the individuals or entities whose sensitive personal data is collected, including identity theft and embarrassment. Not only would this breach have the potential of exposing individuals to malicious wrongdoing, the fallout from such breaches may result in damage to reputation, potential liability, and costly remedial action for the organizations that collected the information and that were under an obligation to maintain its confidentiality and security. These breaches may result in not only financial loss, but loss of credibility, confidence, and trust from individuals, stakeholders, and the public.

In order to reduce the risks associated with obtaining, storing, and using personal data, private companies and other organizations have begun to train their employees to properly handle personal data. However, such training efforts may be implemented inconsistently, which may, in turn, result in the inconstant implementation of proper procedures for handling personal data. Accordingly, there is a need for improved systems and methods for evaluating the privacy maturity of particular individuals and/or groups of individuals within an organization.

SUMMARY

A computer-implemented data processing method for measuring a particular business unit within an organization's compliance with one or more privacy requirements, according to particular embodiments, comprises: (1) receiving, by one or more processors, a request to measure a privacy maturity of the particular business unit; and (2) in response to receiving the request, retrieving, by one or more processors, from a privacy compliance system, an electronic record comprising information associated with one or more privacy impact assessments submitted by the particular business unit, wherein the privacy compliance system digitally stores the electronic record associated with the one or more privacy impact assessments and the electronic record comprises: (a) one or more types of personal data collected as part of one or more privacy campaigns for which the privacy impact assessment was performed; (b) a subject from which the personal data was collected; (c) a storage location of the personal data; and (d) one or more access permissions associated with the personal data. In any embodiment described herein, the method may further comprise: (1) determining, by one or more processors, one or more identified issues with the one or more privacy impact assessments; (2) determining, by one or more processors, based at least in part on the one or more privacy impact assessments, information associated with privacy campaign data collected as part of the one or more privacy campaigns; (3) receiving, by one or more processors, training data associated with one or more individuals associated with the particular business unit; (4) generating, by one or more processors, a privacy maturity report for the particular business unit based at least in part on the one or more identified issues, the information associated with the privacy campaign data, and the training data; and (5) displaying, by one or more processors, the privacy maturity report on a display screen associated with a computing device.

A computer-implemented data processing method for measuring a particular organization's compliance with one or more requirements associated with one or more pieces of computer code originating from the particular organization, in some embodiments, comprises: (1) determining, by one or more processors, for each of the one or more pieces of computer code, one or more respective storage locations; (2) electronically obtaining, by one or more processors, each of the one or more pieces of computer code based on the one or more respective storage locations; (3) automatically electronically analyzing each of the one or more pieces of computer code to determine one or more privacy-related attributes of each of the one or more pieces of computer code, each of the privacy-related attributes indicating one or more types of privacy campaign data that the computer code collects or accesses; (4) retrieving, by one or more processors, for at least one individual associated with the organization, privacy training data comprising an amount of privacy training received by the at least one individual; (5) determining, by one or more processors, based at least in part on the one or more types of privacy campaign data that the computer code collects or accesses and the privacy training data, a privacy maturity score for the particular organization; and (6) displaying, by one or more processors, the privacy maturity score on a display screen associated with a computing device.

A computer-implemented data processing method for measuring a privacy maturity of a sub-group within an organization, according to particular embodiments, comprises: (1) determining, by one or more processors, a number of issues identified by one or more privacy impact assessments performed on each of a plurality of privacy campaigns undertaken by the sub-group; and (2) determining, by one or more processors, from a privacy compliance system, information associated with privacy campaign data collected as part each of the plurality of privacy campaigns, wherein the privacy compliance system digitally stores an electronic record associated with each of the plurality of privacy campaigns and the electronic record comprises: (a) one or more types of personal data collected as part of each of the plurality of privacy campaigns; (b) a subject from which the personal data was collected; (c) a storage location of the personal data; and (d) one or more access permissions associated with the personal data. In further embodiments, the method comprises: (1) receiving, by one or more processors, training data associated with one or more individuals associated with the particular sub-group; (2) determining, by one or more processors, a privacy maturity for the particular sub-group based at least in part on the number of issues identified by the one or more privacy impact assessments, the information associated with privacy campaign data, and the training data; and (3) displaying, by one or more processors, the privacy maturity on a display screen associated with a computing device.

BRIEF DESCRIPTION OF THE DRAWINGS

Various embodiments of a system and method for privacy compliance measurement are described below. In the course of this description, reference will be made to the accompanying drawings, which are not necessarily drawn to scale, and wherein:

FIGS. 5-13 depict exemplary screen displays and graphical user interfaces (GUIs) according to various embodiments of the system, which may display information associated with the system or enable access to or interaction with the system by one or more users.

DETAILED DESCRIPTION

Figure 1:
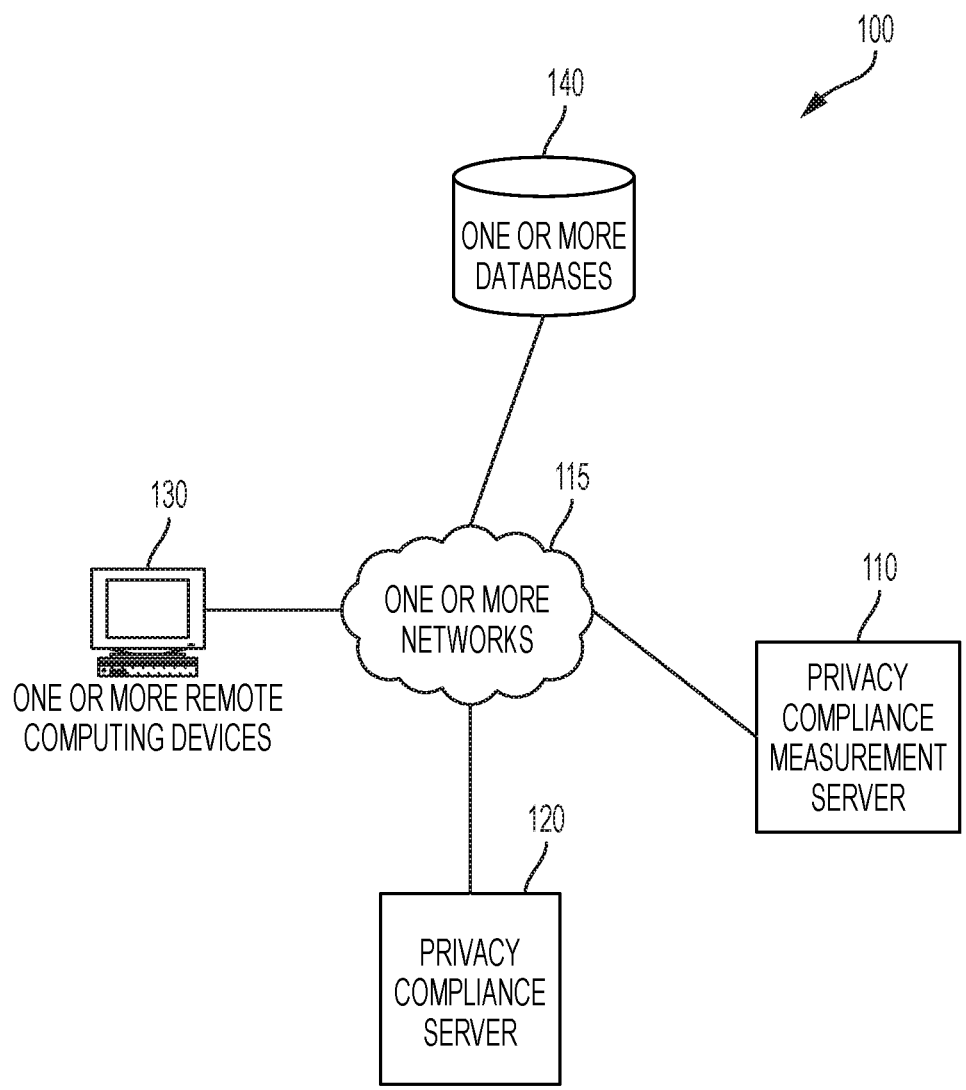
FIG. 1 depicts a privacy compliance measurement system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A privacy compliance measurement system, according to various embodiments, is configured to determine compliance with one or more privacy compliance requirements by an organization or sub-group of the organization (e.g., one or more business groups or units within the organization). In particular embodiments, the system is configured to determine compliance with the one or more privacy compliance requirements based on, for example: (1) a frequency of risks or issues identified with Privacy Impact Assessments (PIAs) performed or completed by the one or more business units; (2) a relative training level of members of the one or more business units with regard to privacy related matters; (3) a breadth and amount of personal data collected by the one or more business units; and/or (4) any other suitable information related to the one or more business units' collection and storage of personal data.

In particular embodiments, the system is configured to determine a privacy maturity score (e.g., privacy maturity level) for a particular business unit that may, for example, be based at least in part on: (1) a percentage of PIAs associated with the particular business unit that the system identifies as having a high, medium, or low number of issues; (2) a total number of PIAs performed by the particular business unit; (3) a number of privacy campaigns initiated by the particular business unit; (4) an amount of personal data collected and stored by the particular business unit; (5) a number of individuals within the particular business unit who have received formal privacy training; (6) a number of individuals within the particular business unit who have received a privacy-related professional certification; and/or (7) any other suitable factor. In various embodiments, the system is configured to enable a user to customize the one or more factors upon which the privacy maturity score is determined.

In particular embodiments, the privacy compliance measurement system may be implemented in the context of any suitable privacy compliance system that is configured to ensure compliance with one or more legal or industry standards related to the collection and storage of private information. In particular embodiments, a particular organization or sub-group may initiate a privacy campaign as part of its business activities.

In various embodiments, a privacy campaign may include any undertaking by a particular organization (e.g., such as a project or other activity) that includes the collection, entry, and/or storage (e.g., in memory) of any privacy information or personal data associated with one or more individuals. This personal data may include, for example, for an individual: (1) name; (2) address; (3) telephone number; (4) e-mail address; (5) social security number; (6) information associated with one or more credit accounts (e.g., credit card numbers); (7) banking information; (8) location data; (9) internet search history; (10) account data; and (11) any other suitable personal information discussed herein.

As generally discussed above, a particular organization may be required to implement operational policies and processes to comply with one or more legal requirements in handling such personal data. A particular organization may further take steps to comply with one or more industry best practices. In particular embodiments, these operational policies and processes may include, for example: (1) storing personal data in a suitable location; (2) limiting access to the personal data to only suitable individuals or entities within the origination or external to the organization; (3) limiting a length of time for which the data will be stored; and (4) any other suitable policy to ensure compliance with any legal or industry guidelines. In particular embodiments, the legal or industry guidelines may vary based at least in part on, for example: (1) the type of data being stored; (2) an amount of data; (3) whether the data is encrypted; (4) etc.

For example, a particular organization's privacy compliance system may store information related to a plurality of privacy campaigns that the particular organization has undertaken. Each particular privacy campaign may include the receipt or entry and subsequent storage of personal data associated with one or more individuals as part of the privacy campaign. An exemplary privacy campaign, may, for example, include the collection and storage of the organization's employees' names, contact information, banking information, and social security numbers for use by the organization's accounting department for payroll purposes.

In particular embodiments, the system is configured to rate the privacy maturity of a particular organization or sub-group's execution of privacy campaigns in general. This may include, for example, rating the ability or likelihood of these organizations or sub-groups to comply with the legal and industry standards when initiating new privacy campaigns and participating in existing privacy campaigns. By rating the privacy maturity of a particular organization or sub-group, the system may enable privacy officers, administrators, or the system to identify those organizations or sub-groups whose privacy campaigns may require additional auditing or modification to ensure compliance with any legal or industry guidelines.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a Privacy Compliance Measurement System 100 according to a particular embodiment. In various embodiments, the Privacy Compliance Measurement System 100 is part of a Privacy Compliance System, or a plurality of Privacy Compliance Systems, which may each be associated with a respective particular organization. In various embodiments, each particular Privacy Compliance System may be associated with a respective particular organization and be configured to manage one or more privacy campaigns, projects, or other activities associated with the particular organization. In some embodiments, the Privacy Compliance Measurement System 100 is configured to interface with at least a portion of each respective organization's Privacy Compliance System in order to determine and/or measure a privacy maturity of the organization or one or more sub-groups within the organization (e.g., one or more business groups).

As may be understood from FIG. 1, the Privacy Compliance Measurement System 100 includes one or more computer networks 115, a Privacy Compliance Measurement Server 110, a Privacy Compliance Server 120, one or more remote computing devices 130 (e.g., a desktop computer, laptop computer, tablet computer, etc.), and one or more databases 140. In particular embodiments, the one or more computer networks 115 facilitate communication between the Privacy Compliance Measurement Server 110, Privacy Compliance Server 120, one or more remote computing devices 130 (e.g., a desktop computer, laptop computer, tablet computer, etc.), and one or more databases 140.

The one or more computer networks 115 may include any of a variety of types of wired or wireless computer networks such as the Internet, a private intranet, a public switch telephone network (PSTN), or any other type of network. The communication link between the Privacy Compliance Measurement Server 110 and the one or more databases 140 may be, for example, implemented via a Local Area Network (LAN) or via the Internet.

Figure 2:
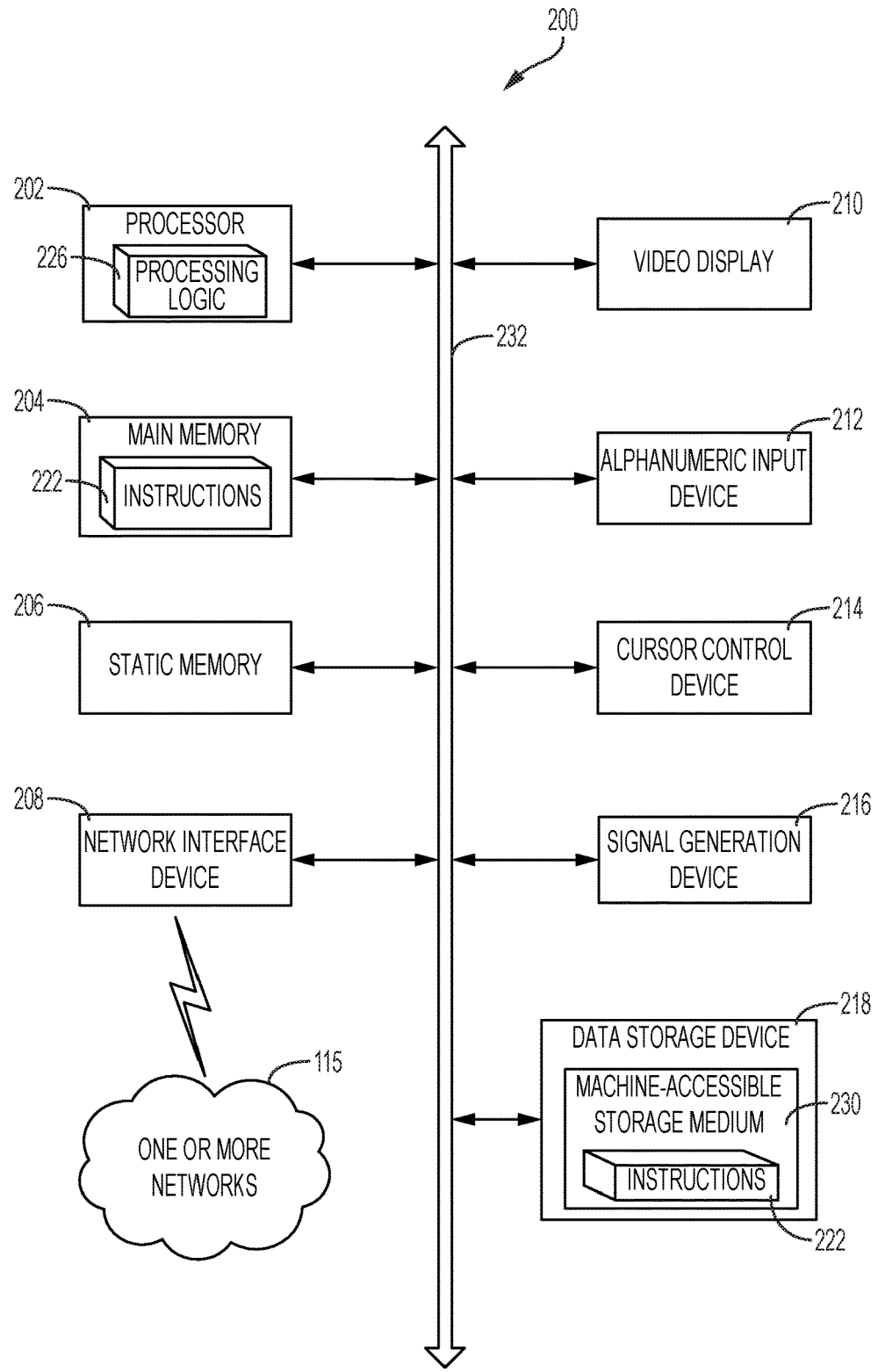
FIG. 2 is a schematic diagram of a computer (such as the privacy compliance measurement server 110, or one or more remote computing devices 130) that is suitable for use in various embodiments of the privacy compliance measurement system shown in FIG. 1.

FIG. 2 illustrates a diagrammatic representation of a computer 200 that can be used within the Privacy Compliance Measurement System 100, for example, as a client computer (e.g., one or more remote computing devices 130 shown in FIG. 1), or as a server computer (e.g., Privacy Compliance Measurement Server 110 shown in FIG. 1). In particular embodiments, the computer 200 may be suitable for use as a computer within the context of the Privacy Compliance Measurement System 100 that is configured to facilitate measurement of a particular organization's privacy maturity as it relates to one or more privacy campaigns.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium", and similar terms, such as "non-transitory computer-readable medium", should be understood to include a single medium or multiple media (e.g., a centralized or distributed database, and/or associated caches and servers) that store the one or more sets of instructions. Such terms should also be understood to include any medium that is capable of storing, encoding or carrying a set of instructions for execution by the computer and that cause the computer to perform any one or more of the methodologies of the present invention. Such terms should accordingly be understood to include, but not be limited to, solid-state memories, optical and magnetic media, etc.

Exemplary System Platform

Various embodiments of a privacy compliance measurement system may be implemented in the context of any suitable privacy compliance system. For example, the privacy compliance measurement system may be implemented to determine the privacy maturity of a particular organization or sub-group of the organization related to the collection and storage of personal data by those organizations or sub-groups. The system may, for example, be configured to measure the privacy maturity of the organization based on an overall handling of privacy campaigns by the organization. Various aspects of the system's functionality may be executed by certain system modules, including a Privacy Compliance Measurement Module 300 and Privacy Campaign Modification Module 400. These modules are discussed in greater detail below. Although these modules are presented as a series of steps, it should be understood in light of this disclosure that various embodiments of the various modules described herein may perform the steps described below in an order other than in which they are presented. In other embodiments, any module described herein may omit certain steps described below. In still other embodiments, any module described herein may perform steps in addition to those described.

Privacy Compliance Measurement Module

In particular embodiments, a Privacy Compliance Measurement Module 300 is configured to measure the privacy maturity of a particular organization or sub-group within the organization. As described above, the privacy maturity may include the organization's or sub-group's acumen for adhering to one or more privacy compliance requirements.

Figure 3:
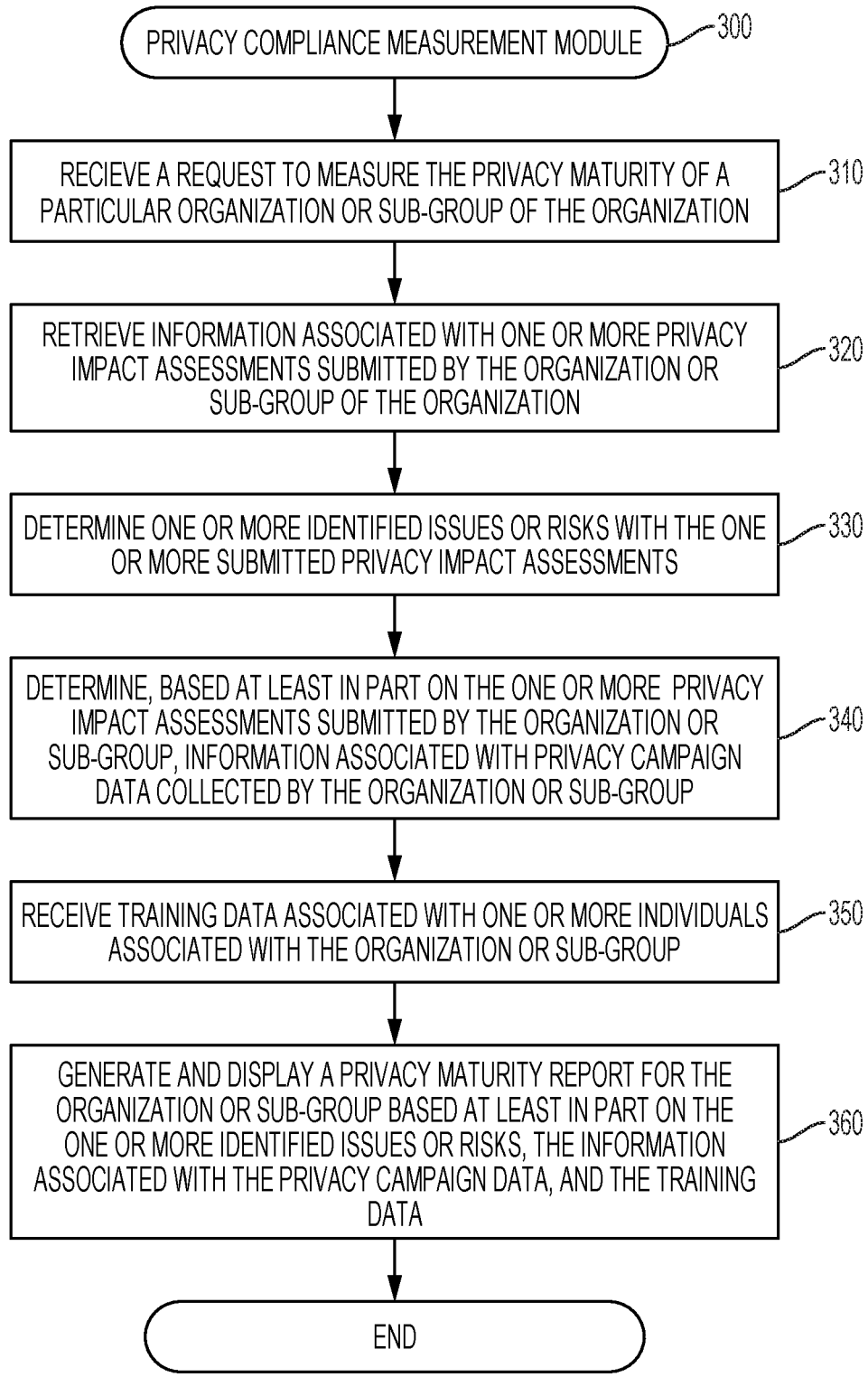
FIG. 3 is a flow chart showing an example of a process performed by a Privacy Compliance Measurement Module according to particular embodiments.

Turning to FIG. 3, in particular embodiments, when executing the Privacy Compliance Measurement Module 300, the system begins, at Step 310, by receiving a request to measure the privacy maturity of a particular organization or sub-group of the organization, which may, for example, be based on the organization's historical compliance with one or more privacy requirements in addition to a likelihood of continued compliance. As may be understood in light of this disclosure, a particular organization or sub-group may obtain, use, store, and/or transfer (e.g., among sub-groups within the organization) personal data, including sensitive personal data as part of a privacy campaign. The organization may further implement operational policies and processes that strive to comply with industry best practices and legal requirements in the handling of that personal data. In various embodiments, the operational policies and processes may include performing privacy impact assessments by the organization and/or one or more sub-groups within the organization.

In particular embodiments, the privacy maturity rating (e.g., numerical score or text score, such as "excellent" or "poor") of the organization or sub-group may include a rating related to the organization or sub-group's compliance with the industry best practices and/or legal requirements related to the handling of personal data. In various embodiments, the privacy maturity rating may comprise a privacy maturity rating (e.g., relative rating) based on a particular scale (e.g., from 0-10, from 0-100, a percentage rating, etc.). In some embodiments, the privacy maturity rating may be further based on a likelihood of continued compliance with such legal and industry requirements, which the system may determine, for example, based on one or more attributes of the organization and/or its individual members. In particular embodiments, the privacy maturity rating may be based at least in part on, for example: (1) one or more issues or risks identified in privacy assessments submitted by the particular business unit; (2) a size and type of personal data used by the business unit; (3) a training level on various privacy issues of one or more members of the business unit; and/or (4) any other suitable factor. In further embodiments, the privacy maturity rating may be accompanied by a report that includes a number of identified issues in one or more privacy impact assessments submitted by the organization or sub-group.

Continuing to Step 320, the system retrieves information associated with one or more privacy impact assessments submitted by the organization or sub-group of the organization. In particular embodiments, the system may retrieve the information associated with the one or more privacy impact assessments in response to the request to measure the privacy maturity of the particular organization or sub-group received at Step 310. As may be understood in light of this disclosure, when initiating a new privacy campaign (e.g., any undertaking by a particular organization or sub-group that includes the collection, entry, and/or storage of any privacy information or personal data associated with one or more individuals), a particular organization may complete or perform a privacy impact assessment for the privacy campaign. An organization or sub-group may further complete or perform a privacy impact assessment for an existing privacy campaign.

In various embodiments, the privacy campaign may be associated with an electronic data structure comprising privacy campaign data. In particular embodiments, the privacy campaign data comprises a description of the privacy campaign, one or more types of personal data related to the campaign, a subject from which the personal data is collected as part of the privacy campaign, a storage location of the personal data (e.g., including a physical location of physical memory on which the personal data is stored), one or more access permissions associated with the personal data, and/or any other suitable data associated with the privacy campaign.

An exemplary privacy campaign, project, or other activity may include, for example: (1) the implementation of new hardware and/or software for storing and accessing personal data; (2) the implementation of a data sharing initiative where two or more organizations seek to pool and/or link one or more sets of personal data; (3) implantation of a proposal to identify people in a particular group or demographic and initiate a course of action; (4) using existing personal data for a new purpose; and/or (5) the consolidation of information held by separate parts of a particular organization. In still other embodiments, the particular privacy campaign, project or other activity may include any other privacy campaign, project, or other activity discussed herein, or any other suitable privacy campaign, project, or activity.

During a privacy impact assessment for a particular privacy campaign, a privacy impact assessment system may ask one or more users (e.g., one or more individuals associated with the particular organization or sub-group that is undertaking the privacy campaign) a series of privacy impact assessment questions regarding the particular privacy campaign and then store the answers to these questions in the system's memory, or in memory of another system, such as a third-party computer system.

Such privacy impact assessment questions may include questions regarding, for example: (1) what type of data is to be collected as part of the campaign; (2) who the data is to be collected from; (3) where the data is to be stored; (4) who will have access to the data; (5) how long the data will be kept before being deleted from the system's memory or archived; and/or (6) any other relevant information regarding the campaign. In various embodiments, a privacy impact assessment system may determine a relative risk and/or potential issues with a particular privacy campaign as it related to the collection and storage of personal data. For example, the system may be configured to identify a privacy campaign as being "High" risk, "Medium" risk, or "Low" risk based at least in part on answers submitted to the questions listed above. For example, a Privacy Impact Assessment that revealed that credit card numbers would be stored without encryption for a privacy campaign would likely cause the system to determine that the privacy campaign was high risk.

Continuing at Step 330, the system is configured to determine one or more identified risks with the one or more submitted privacy impact assessments. As may be understood in light of this disclosure, the system may be configured to determine one or more identified risks based on, for example: (1) one or more risks or issues identified as part of a review of a particular privacy impact assessment or privacy campaign performed by one or more third party regulators; (2) one or more issues or risks identified as part of a particular privacy impact assessment prior to initiation of a particular privacy campaign (e.g., by one or more other members of the organization or sub-group, by a system configured for identifying such issues or risks, etc.); (3) one or more issues or risks identified for an existing privacy campaign; and/or (4) etc.

In various embodiments, the one or more issues or risks may include, for example, that: (1) unnecessary personal data is to be collected as part of the privacy campaign; (2) personal data is to be stored in a manner that fails to meet one or more particular legal requirements or best industry practices; (3) personal data is to be stored in a non-suitable location; (4) access to the personal data will be available to too many individuals or entities within the origination, or external to the organization; and/or (5) any other potential issue or risk that may arise or that may have been identified based on a proposed collection and storage of personal data that makes up part of the privacy campaign.

Continuing to Step 340, the system determines, based at least in part on the one or more privacy impact assessments submitted by the organization or sub-group, information associated with privacy campaign data collected by the organization or sub-group. In various embodiments, the information associated with privacy campaign data collected by the organization or sub-group may include, for example: (1) a total number of privacy impact assessments performed or completed by the organization or sub-group; (2) a number of privacy campaigns undertaken or currently in effect that were initiated by the organization or sub-group; (3) an amount of personal data collected as part of those privacy campaigns; (4) a type of the personal data collected; (5) a volume of personal data transferred by the organization or sub-group (e.g., both within the organization or sub-group and externally to third parties, other sub-groups within the organization, etc.); and/or (6) any other suitable information related to privacy campaign data collected by the organization or sub-group or the organization or sub-group's other privacy campaign activities.

In various embodiments, the system is configured to substantially automatically track an amount of data received as part of any particular privacy campaign associated with the organization or sub-group as well as a volume of personal data transferred by the organization or sub-group. The system may, for example, track and store, in memory, a running total of privacy campaign data collected on behalf of a particular organization or subgroup. In such embodiments, the system may be configured to retrieve such information for use in determining the privacy maturity of the subgroup without having to determine the amount on-the-fly. The system may, for example, continuously track personal data collection and transfer in substantially real-time. In this way, the system may be configured to conserve processing power that would otherwise be required to determine a total amount of personal data collected and/or transferred at the time that the system is measuring privacy maturity. The system may be configured to store information related to the amount and volume of personal data collected and transferred in any suitable database. In particular embodiments, the system is further configured to associate, in memory, the collected and/or transferred data with a particular privacy campaign for which it was collected and/or transferred.

Returning to Step 350, the system continues by receiving training data associated with one or more individuals associated with the organization or sub-group. In particular embodiments, the training data may include, for example, training data associated with any suitable member of the organization or sub-group. In various embodiments, the training data comprises training data associated with one or more privacy officers within the sub-group (e.g., one or more individuals tasked with overseeing one or more privacy campaigns undertaken by the organization or sub-group). In still other embodiments, the training data comprises training data associated with any individual that has at least partially completed or performed a privacy impact assessment for the organization or sub-group. In still other embodiments, the training data includes training data for every member of a particular organization or sub-group (e.g., all employees within a Marketing business unit that have access to personal data collected as part of one or more privacy campaigns).

In various embodiments, the system is configured to retrieve the training data from memory. In such embodiments, the system is configured to maintain a database (e.g., in memory) of training data for each of a plurality of employees and other individuals associated with a particular organization or sub-group (e.g., business unit). In various embodiments, the system is configured to receive input, by any suitable individual, of updated training data for particular individuals associated with the organization or sub-group. For example, the system may receive a listing of one or more individuals who have received a particular privacy certification within the organization or sub-group.

In any embodiment described herein, the training data may include, for example: (1) a number or percentage of individuals within the organization or sub-group who have completed one or more privacy trainings (e.g., viewed one or more privacy videos, attended one or more privacy training sessions, etc.); (2) a number or percentage of individuals within the organization or sub-group who have completed one or more privacy-related quizzes or tests indicating knowledge of proper procedures relating to the collection and storage of personal data; (3) a number or percentage of individuals within the organization or sub-group who have attended one or more privacy events (e.g., internal privacy events within the organization or external privacy events put on by one or more third parties) such as a privacy conference or seminar; (4) a number or percentage of individuals within the organization or sub-group that are members of the International Association of Privacy Professionals (IAPP) or other privacy professional association; (5) a number or percentage of individuals within the organization or sub-group that hold one or more certifications related to privacy (e.g., CIPP certification, CIPT certification; CIPM certification, etc.), for example, through one or more privacy professional organizations (e.g., such as IAPP); (6) a number or percentage of individuals within the organization or sub-group that have received formal privacy training; (7) a number or percentage of individuals within the organization or sub-group that utilize one or more available mobile training modules or communication portals as part of a privacy campaign; and/or (8) any other suitable training data related to particular individuals' aptitude and training for following legal requirements and best industry practices related to the collection and storage of personal data and other privacy information.

In particular embodiments, as may be understood in light of this disclosure, the training data associated with particular individuals may impact a particular organization's privacy maturity in that a level of knowledge of the individuals involved with initiating and maintaining privacy campaigns for the organization may affect the organization's effectiveness and consistency in complying with legal and industry privacy requirements. For example, an individual with more training and experience may be less likely to mistakenly assign a particular type of personal data to be stored in an improper location than an individual with no training or experience.

Continuing to Step 360, the system generates and displays a privacy maturity report for the organization or sub-group based at least in part on the one or more identified issues or risks, the information associated with the privacy campaign data, and the training data. In various embodiments, the system is configured to display the privacy maturity report on a computing device via a suitable graphical user interface. In various embodiments, the privacy maturity report may be calculated using a suitable formula. In such embodiments, the system is configured to weigh the factors discussed above in any suitable manner. For example, the system may place higher weight on previous issues found in submitted privacy assessments by a particular organization when determining privacy maturity. In still other embodiments, the system may be configured to give a higher weight to a total amount of personal data handled by the organization (e.g., because, for example, an organization that has experience handling a large amount of personal data may be better equipped to follow legal and industry guidelines).

In various embodiments, the system is configured to assign a privacy maturity score to the particular organization or sub-group. The privacy maturity score may enable users of the privacy compliance measurement system to compare one or more organization's privacy maturity based on their relative respective scores. In this way, for example, a particular organization may be able to determine which business groups within the organization require, for example: (1)

additional training in privacy matters; (2) additional oversight of their associated privacy campaigns; (3) etc.

Although the Privacy Compliance Measurement Module 300 is described above in reference to generating a privacy maturity report in response to a request to measure privacy maturity, it should be understood that any embodiment of the system described herein may measure privacy maturity of particular business groups or other sub-groups within an organization substantially automatically. For example, in any embodiment described herein, the system may be configured to substantially automatically measure a particular group's privacy maturity according to a particular schedule (e.g., weekly, monthly, quarterly, annually, every certain number of years, and/or according to any other suitable review schedule). In particular embodiments, the system is configured to substantially automatically measure a particular group's privacy maturity based at least in part on a type of privacy campaign, project, or other activity that the group undertakes that relates to the collection and storage of personal data.

Privacy Assessment Modification Module

In particular embodiments, a Privacy Assessment Modification Module 400 is configured to modify one or more aspects related to one or more privacy campaigns of a particular sub-group within an organization based at least in part on the sub-group's privacy maturity. For example, the system may, in various embodiments, initiate stricter review standards or oversight for those sub-groups with relatively low privacy maturity scores. In another example, the system may automatically generate or distribute electronic training materials to members of a sub-group with a low privacy maturity score.

Figure 4:
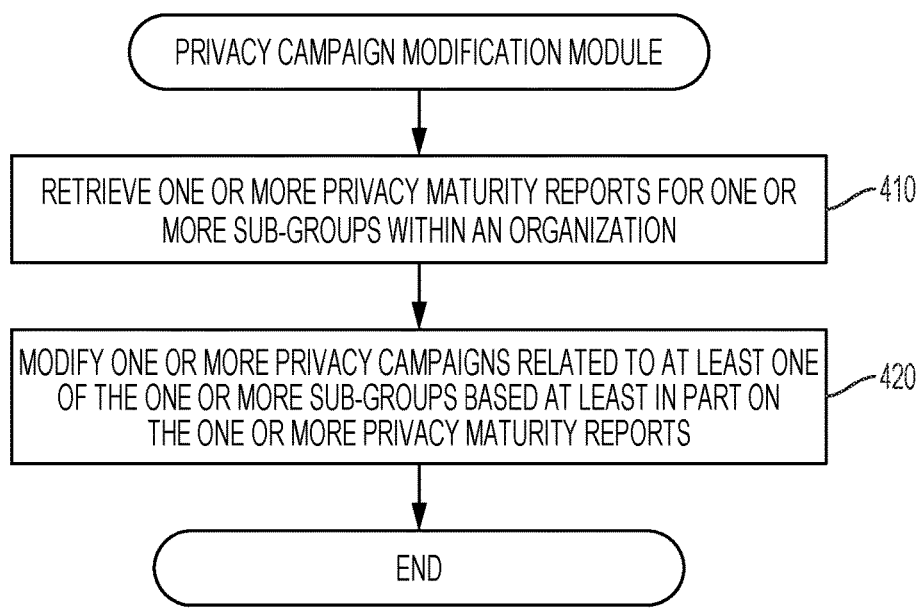
FIG. 4 is a flow chart showing an example of a process performed by a Privacy Campaign Modification Module.

In particular embodiments, modifying one or more aspects of one or more privacy campaigns of various sub-groups within an organization may conserve resources related to reviewing and analyzing privacy impact assessments and privacy campaigns for the organization as a whole. Turning to FIG. 4, in particular embodiments, when executing the Privacy Assessment Modification Module 400, the system begins, at Step 410, by retrieving one or more privacy maturity reports for one or more sub-groups within an organization. In particular embodiments, the system is configured to retrieve the one or more privacy maturity reports from memory. In various embodiments, the one or more privacy maturity reports may have been produced using the Privacy Maturity Measurement Module 300 described above. In various embodiments, the system is configured to retrieve one or more privacy maturity reports for one or more sub-groups within the organization for which the organization desires to compare privacy maturity.

Continuing to Step 420, the system modifies one or more privacy campaigns related to at least one of the one or more sub-groups based at least in part on the one or more privacy maturity reports. In particular embodiments, the system is configured to substantially automatically modify any suitable privacy assessment aspect related to the at least one of the one or more sub-groups. For example, a particular privacy campaign initiated by the at least one sub-group may include a particular privacy audit schedule (e.g., weekly, monthly, annually, etc.). In various embodiments, the privacy audit may be substantially automatically performed by a system according to the schedule in order to review the personal data collection and storage procedures utilized by the particular privacy campaign.

In this example, the system may be configured to modify the audit schedule based on the one or more privacy maturity reports by increasing the frequency of the privacy audits in response to determining that the at least one sub-group has a lower privacy maturity score than other sub-groups within the organization. In this way, the system may allocate limited resources (e.g., computing resources) to auditing and assessing those privacy campaigns that have been initiated and are maintained and run by sub-groups within the organization that are more likely to have an issue or run afoul of one or more legal requirements or best industry practices relating to personal data collection and storage.

In particular embodiments, the system is configured to substantially automatically trigger a review of at least one aspect of at least one privacy campaign associated with at least one sub-group within the organization based on the one or more privacy maturity reports. For example, the system may determine, based on the one or more privacy maturity reports, that the at least one-subgroup has a large number of associated privacy campaigns and a high privacy maturity score. However, the system may further determine that the at least one sub-group, in its privacy campaigns, has a large crossover of personal data stored as part of the various privacy campaigns, and often utilizes data storage techniques that exceed legal and industry requirements. In such embodiments, the system may substantially automatically modify one or more aspects of the privacy campaigns to meet but not exceed a particular legal or industry standard. In such embodiments, the system may, for example, be configured to: (1) limit redundancy of stored data (e.g., which may conserve memory) across privacy campaigns that collect similar data; (2) eliminate unnecessary data permission limitations; and/or (3) take any other action which may limit privacy campaign data recall times, storage size, transfer time, etc.

Exemplary User Experience

In exemplary embodiments of a privacy compliance measurement system, a user may access a privacy compliance system, for example: (1) to initiate a new privacy campaign; (2) to perform or complete a privacy impact assessment; (3) to review one or more privacy maturity reports; (4) to provide one or more metrics to customize a determination of privacy maturity; and/or (5) take any other action related to the privacy compliance system. For example, a user that is part of a particular business group within an organization (e.g., an IT group) may access the system to initiate a privacy impact assessment that the system may later use as part of a determination regarding a privacy maturity of the particular business group. FIGS. 5-13 depict exemplary screen displays of a privacy compliance system and a privacy compliance measurement system according to particular embodiments. As may be understood from these figures in light of this disclosure, a privacy compliance system may provide access to the privacy compliance system (e.g., to an individual associated with an organization) via one or more GUIs with which the individual may: (1) initiate a new privacy campaign, project, or other activity; (2) modify an existing privacy campaign; (3) view privacy maturity data, etc.

The one or more GUIs may enable the individual to, for example, provide information such as: (1) a description of the campaign; (2) the personal data to be collected as part of the campaign; (3) who the personal data relates to; (4) where the personal data is to be stored; and (5) who will have access to the indicated personal data, etc. Various embodiments of a system for implementing and auditing a privacy campaign are described in U.S. patent application Ser. No. 15/169,643, filed May 31, 2016 entitled "Data Processing Systems and Methods for Operationalizing Privacy Compliance and Assessing the Risk of Various Respective Privacy Campaigns", which is hereby incorporated by reference herein in its entirety. In particular embodiments, the system is further configured to provide access to a privacy compliance measurement system via one or more GUIs that enable the user to view and compare privacy maturity data for one or more business groups within an organization. These exemplary screen displays and user experiences according to particular embodiments are described more fully below.

Figure 5:
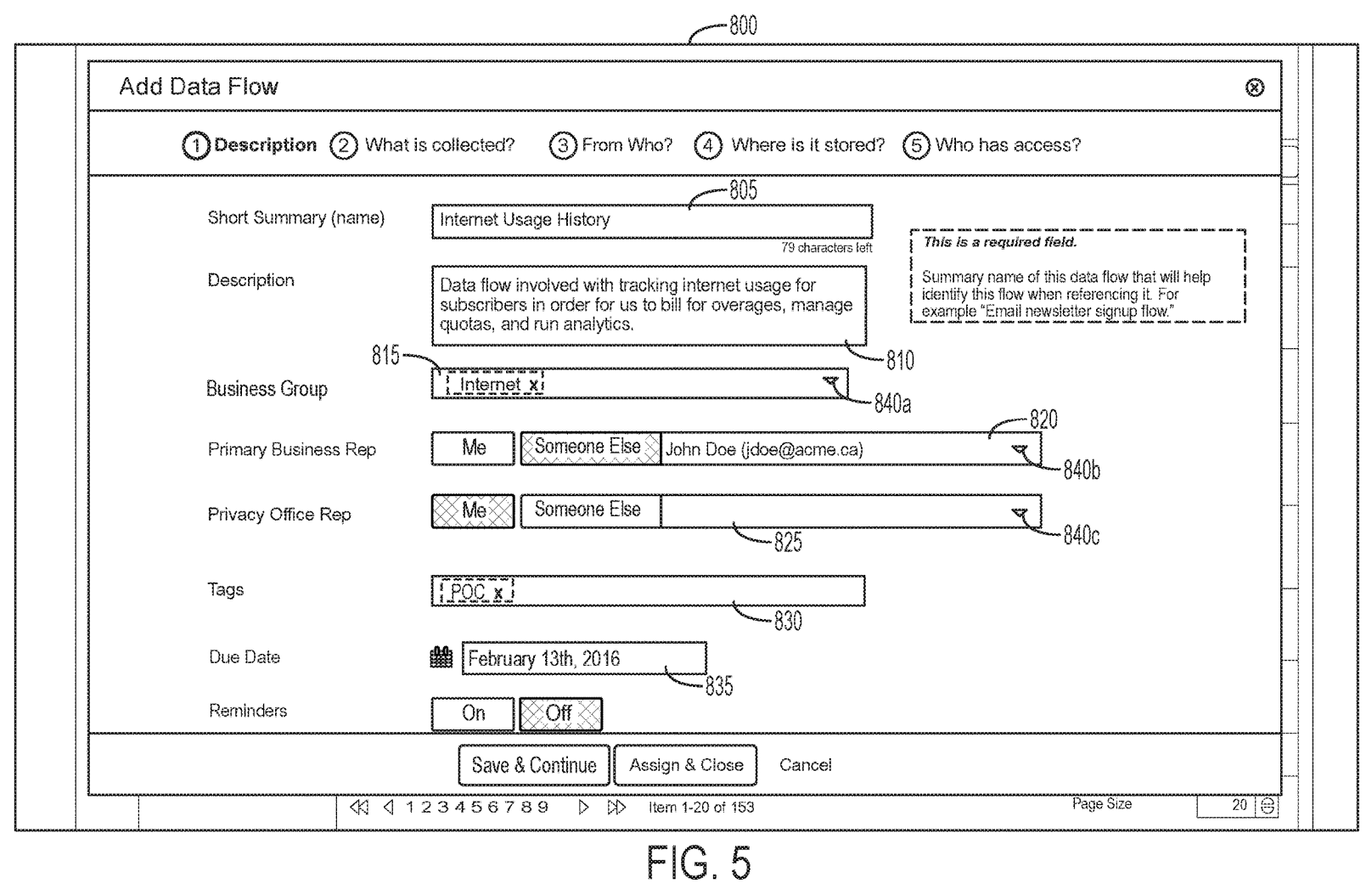

A. FIG. 5: Initiating a New Privacy Campaign, Project, or Other Activity

FIG. 5 illustrates an exemplary screen display with which a user associated with an organization (e.g., or a sub-group or business unit within the organization) may initiate a new privacy campaign, project, or other activity. As may be understood in light of this disclosure, data entered during the initiation of a new privacy campaign may be utilized by the system when determining a privacy maturity of the organization. As may be further understood from this disclosure, training data about the user, or any user that is part of the organization or has any input into the initiation of a particular privacy campaign on behalf of the organization may be received by the system for use in the privacy compliance measurement process described above with respect to Step 350 of the Privacy Compliance Measurement Module 300.

As shown in FIG. 5, a description entry dialog 800 may have several fillable/editable fields and/or drop-down selectors. In this example, the user may fill out the name of the campaign (e.g., project or activity) in the Short Summary (name) field 805, and a description of the campaign in the Description field 810. The user may enter or select the name of the business group (or groups) that will be accessing personal data for the campaign in the Business Group field 815 (i.e., the "Internet" business group in this example). The user may select the primary business representative responsible for the campaign (i.e., the campaign's owner), and designate him/herself, or designate someone else to be that owner by entering that selection through the Someone Else field 820. Similarly, the user may designate him/herself as the privacy office representative owner for the campaign, or select someone else from the second Someone Else field 825.

At any point, a user assigned as the owner may also assign others the task of selecting or answering any question related to the campaign. The user may also enter one or more tag words associated with the campaign in the Tags field 830. After entry, the tag words may be used to search for campaigns, or used to filter for campaigns (for example, under Filters 845). The user may assign a due date for completing the campaign entry, and turn reminders for the campaign on or off. The user may save and continue, or assign and close.

In example embodiments, some of the fields may be filled in by a user, with suggest-as-you-type display of possible field entries (e.g., Business Group field 815), and/or may include the ability for the user to select items from a drop-down selector (e.g., drop-down selectors 840*a*, 840*b*, 840*c*). The system may also allow some fields to stay hidden or unmodifiable to certain designated viewers or categories of users. For example, the purpose behind a campaign may be hidden from anyone who is not the chief privacy officer of the company, or the retention schedule may be configured so that it cannot be modified by anyone outside of the organization's' legal department.

In various embodiments, when initiating a new privacy campaign, project, or other activity (e.g., or modifying an existing one), the user associated with the organization may set a Due Date 835 that corresponds to a date by which the privacy campaign needs to be approved by a third-party regulator (e.g., such that the campaign may be approved prior to launching the campaign externally and/or beginning to collect data as part of the campaign). In various embodiments, the system may limit the proximity of a requested Due Date 835 to a current date based on a current availability of third-party regulators and/or whether the user has requested expedited review of the particular privacy campaign.

B. FIG. 6: Collaborator Assignment Notification and Description Entry

Moving to FIG. 6, in example embodiments, if another business representative (owner), or another privacy office representative has been assigned to the campaign (e.g., John Doe in FIG. 5), the system may send a notification (e.g., an electronic notification) to the assigned individual, letting them know that the campaign has been assigned to him/her. FIG. 6 shows an example notification 900 sent to John Doe that is in the form of an email message. The email informs him that the campaign "Internet Usage Tracking" has been assigned to him, and provides other relevant information, including the deadline for completing the campaign entry and instructions to log in to the system to complete the campaign (data flow) entry (which may be done, for example, using a suitable "wizard" program). The user that assigned John ownership of the campaign may also include additional comments 905 to be included with the notification 900. Also included may be an option to reply to the email if an assigned owner has any questions.

In this example, if John selects the hyperlink Privacy Portal 910, he is able to access the system, which displays a landing page 915. The landing page 915 displays a Getting Started section 920 to familiarize new owners with the system, and also display an "About This Data Flow" section 930 showing overview information for the campaign. As may be understood in light of this disclosure, in response to accessing the Privacy Portal 910 for the particular privacy campaign by John Doe, the system may collect, receive, or otherwise retrieve training data associated with John Doe. In various embodiments, because John Doe may be contributing to the privacy campaign by providing information about various aspects of the privacy campaign, John Doe's training data may become relevant to the privacy maturity of the particular campaign as well as to the organization responsible for the campaign.

Figure 7:
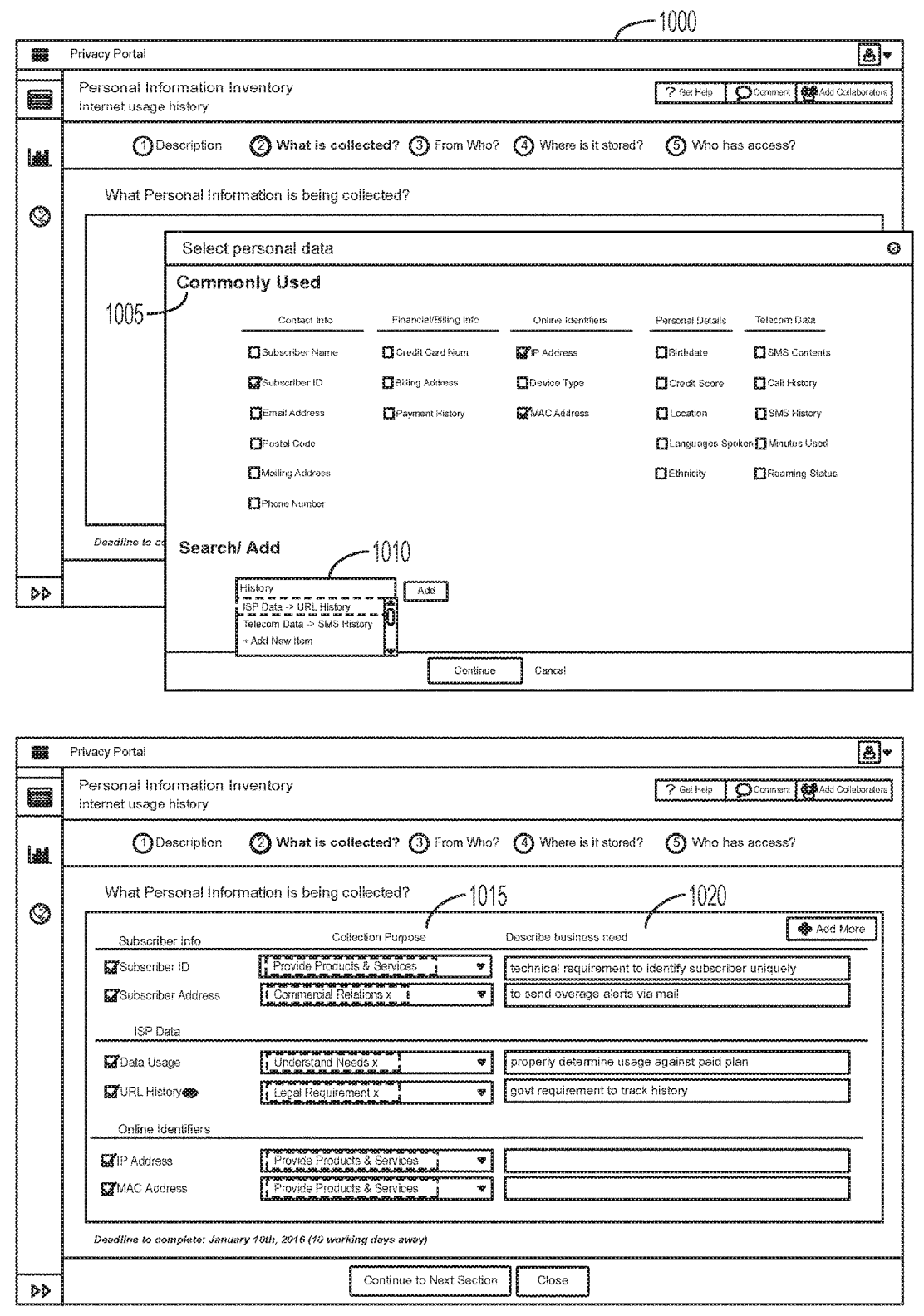

C. FIG. 7: What Personal Data is Collected

FIG. 7 depicts an exemplary screen display that shows a type of personal data that is collected as part of a particular campaign, in addition to a purpose of collecting such data, and a business need associated with the collection. As described in this disclosure, information entered during the initiation of a privacy campaign may be utilized by the system in order to determine a privacy maturity of a particular privacy campaign, organization, sub-group of the organization, or any other suitable entity or undertaking.

As shown in FIG. 7, after the first phase of campaign addition (i.e., description entry phase), the system may present the user (who may be a subsequently assigned business representative or privacy officer associated with the organization) with a dialog 1000 from which the user may enter in the type of personal data being collected.

For example, in FIG. 7, the user may select from Commonly Used 1005 selections of personal data that will be collected as part of the privacy campaign. This may include, for example, particular elements of an individual's contact information (e.g., name, address, email address), Financial/

Billing Information (e.g., credit card number, billing address, bank account number), Online Identifiers (e.g., IP Address, device type, MAC Address), Personal Details (Birthdate, Credit Score, Location), or Telecommunication Data (e.g., Call History, SMS History, Roaming Status). The System 100 is also operable to pre-select or automatically populate choices—for example, with commonly-used selections 1005, some of the boxes may already be checked. The user may also use a search/add tool 1010 to search for other selections that are not commonly used and add another selection. Based on the selections made, the system may present the user with more options and fields. For example, in response to the user selecting "Subscriber ID" as personal data associated with the campaign, the user may be prompted to add a collection purpose under the heading Collection Purpose 1015, and the user may be prompted to provide the business reason why a Subscriber ID is being collected under the "Describe Business Need" heading 1020.

D. FIG. 8: Who Personal Data is Collected from

FIG. 8 depicts a screen display that shows who personal data is collected from in the course of the privacy campaign. As discussed herein, particular privacy campaigns may collect personal data from different individuals, and guidelines may vary for privacy campaigns based on particular individuals about whom data is collected. Laws may, for example, allow an organization to collect particular personal data about their employees that they are unable to collect about customers, and so on. In various embodiments, a particular business unit's privacy maturity may depend upon who the business unit is collecting personal data from. For example, in response to determining that a business unit collects data from a wide range of individuals including minors and members of various legal jurisdictions (e.g., across different countries), the system may rate the business unit as having a low privacy maturity score where members of the business unit are not particularly highly trained regarding the handing of these particular types of personal data.

As shown in the example of FIG. 8, the system may be configured to enable an organization user to enter and select information regarding who the personal data is gathered from as part of the privacy campaign. As noted above, the personal data may be gathered from, for example, one or more subjects. In the exemplary "Collected From" dialog 1100, an organization user may be presented with several selections in the "Who Is It Collected From" section 1105. These selections may include whether the personal data is to be collected from an employee, customer, or other entity as part of the privacy campaign. Any entities that are not stored in the system may be added by the user. The selections may also include, for example, whether the data will be collected from a current or prospective subject (e.g., a prospective employee may have filled out an employment application with his/her social security number on it). Additionally, the selections may include how consent was given, for example, through an end user license agreement (EULA), on-line Opt-in prompt, implied consent, or an indication that the user is not sure. Additional selections may include whether the personal data was collected from a minor, and/or where the subject is located.

Figure 9:
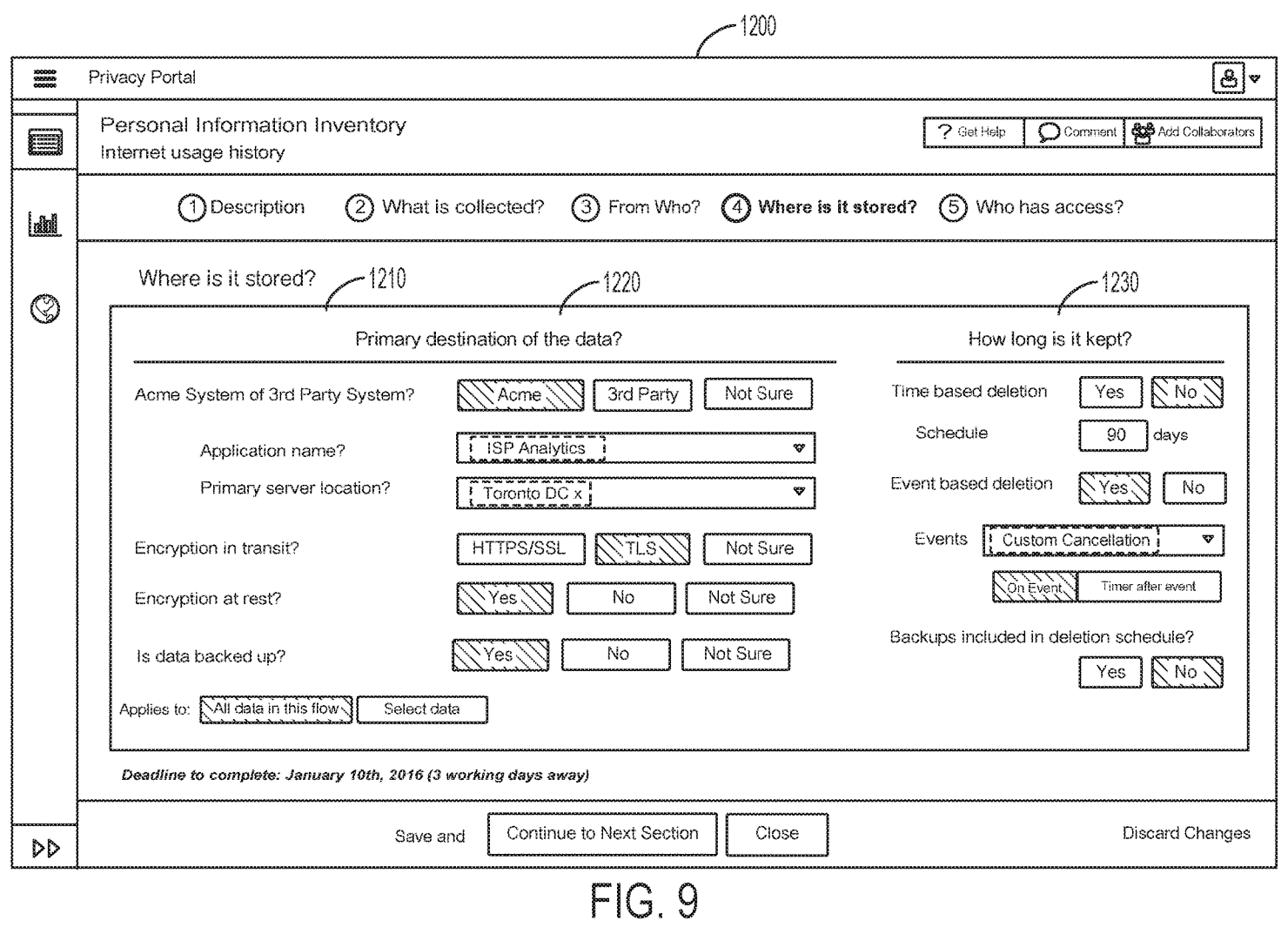

E. FIG. 9: Where is the Personal Data Stored

FIG. 9 depicts a screen display that shows where and how personal data is stored as part of the privacy campaign (e.g., on what physical server and in what location, using what encryption, etc.). As may be understood in light of this disclosure, particular privacy campaigns may collect different types of personal data, and storage guidelines may vary for privacy campaigns based on particular types of personal data collected and stored (e.g., more sensitive personal data may have higher encryption requirements, etc.). As may be understood in light of this disclosure, the system may be configured to substantially automatically modify one or more aspects of a particular privacy campaign in response to determining that a privacy maturity score of a particular business group or sub-group of an organization associated with the privacy campaign is too low. For example, regarding personal information storage, the system may substantially automatically modify a type of encryption used to store personal data (e.g., to a stronger level of encryption) where a particular business group has a relatively low privacy maturity score. In this way, the system may, for example, alleviate or otherwise prevent exposure to potential fines or other sanctions as a result of insufficiently protecting collected data (e.g., by failing to meet one or more legal standards).

FIG. 9 depicts an example "Storage Entry" dialog screen 1200, which is a graphical user interface that an organization user may use to indicate where particular sensitive information is to be stored within the system as part of a particular privacy campaign. From this section, a user may specify, in this case for the Internet Usage History campaign, the primary destination of the personal data 1220 and how long the personal data is to be kept 1230. The personal data may be housed by the organization (in this example, an entity called "Acme") or a third party. The user may specify an application associated with the personal data's storage (in this example, ISP Analytics), and may also specify the location of computing systems (e.g., one or more physical servers) that will be storing the personal data (e.g., a Toronto data center). Other selections indicate whether the data will be encrypted and/or backed up.

In various embodiments, the system also allows the user to select whether the destination settings are applicable to all the personal data of the campaign, or just select data (and if so, which data). As shown in FIG. 9, the organization user may also select and input options related to the retention of the personal data collected for the campaign (e.g., How Long Is It Kept 1230). The retention options may indicate, for example, that the campaign's personal data should be deleted after a pre-determined period of time has passed (e.g., on a particular date), or that the campaign's personal data should be deleted in accordance with the occurrence of one or more specified events (e.g., in response to the occurrence of a particular event, or after a specified period of time passes after the occurrence of a particular event), and the user may also select whether backups should be accounted for in any retention schedule. For example, the user may specify that any backups of the personal data should be deleted (or, alternatively, retained) when the primary copy of the personal data is deleted.

In particular embodiments, the system is configured to prompt the user to provide additional information when indicating where particular sensitive information is to be stored as part of the particular privacy campaign. For example, where the user is part of a business group with a relatively low maturity score, the system may be configured to prompt the user to provide additional information regarding where, how, and how long personal data will be stored as part of the privacy campaign. In some embodiments, the system may automatically generate recommendations to store the personal data in a location other than a location initially entered by the user.

Figure 10:
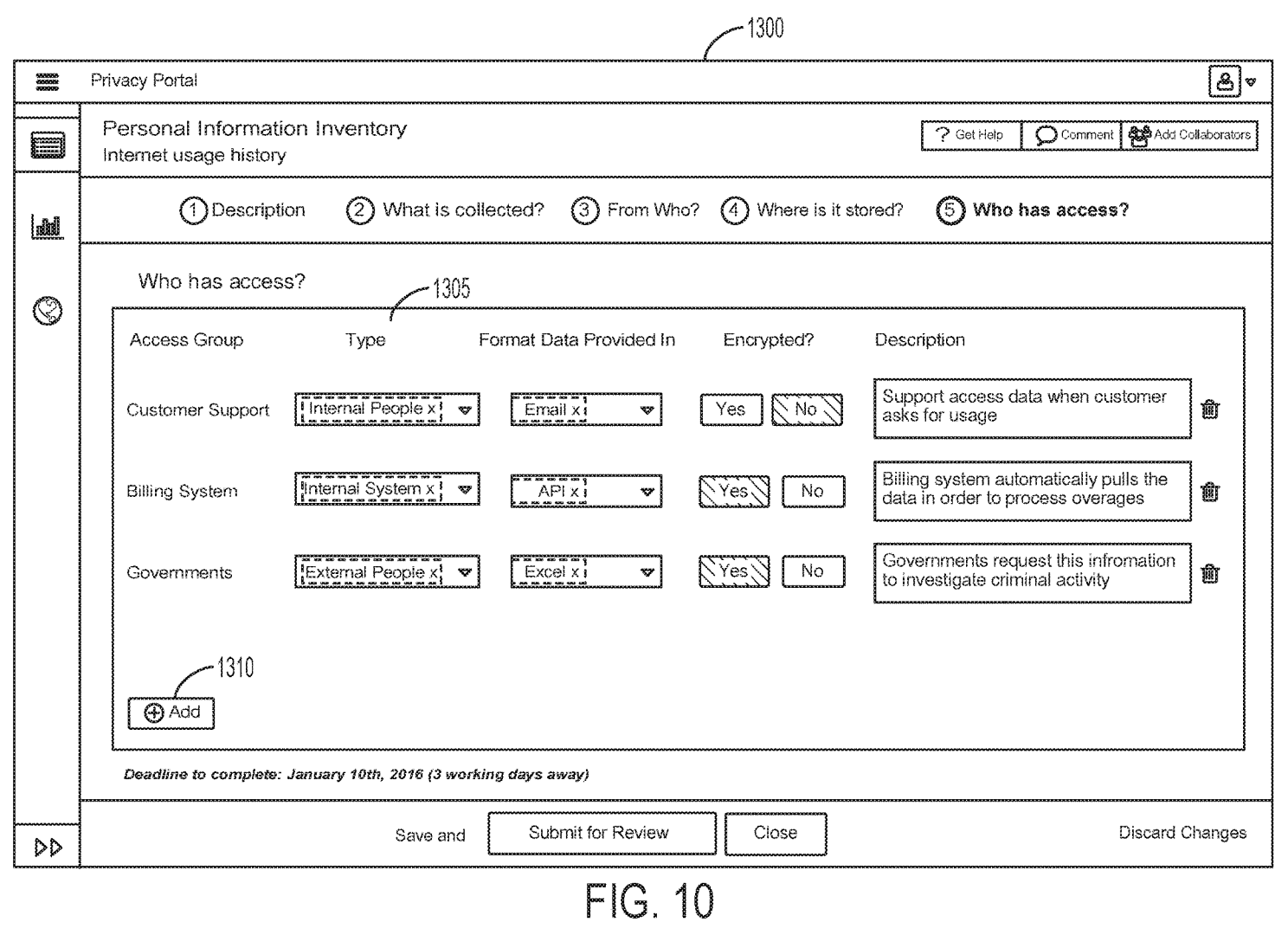

F. FIG. 10: Who and which Systems have Access to Personal Data

FIG. 10 depicts an exemplary screen display that shows who and which systems have access to personal data that is stored as part of the privacy campaign (e.g., what individuals, business groups, etc. have access to the personal data.). As may be understood in light of this disclosure, particular privacy campaigns may require different individuals, groups, or systems within an organization to access personal data to use it for the purpose for which it was collected (e.g., to run payroll, billing purposes, etc.). As may be understood in light of this disclosure, the system may be configured to substantially automatically modify one or more aspects of a particular privacy campaign in response to determining that a privacy maturity score of a particular business group or sub-group of an organization associated with the privacy campaign is too low or very high. For example, regarding who has access to personal data that is stored as part of the privacy campaign, the system may substantially automatically modify one or more permissions for the data to further limit access or remove limitations. In this way, the system may, for example, eliminate unnecessary data permission limitations FIG. 10 depicts an example Access entry dialog screen 1300 that an organization user may use to input various access groups that have permission to access particular personal data that makes up part of the privacy campaign. As part of the process of adding a campaign or data flow, the user may specify particular access groups in the "Who Has Access" section 1305 of the dialog screen 1300. In the example shown, the Customer Support, Billing, and Governments groups within the organization may be able to access the Internet Usage History personal data collected by the organization as part of the privacy campaign. Within each of these access groups, the user may select the type of each group, the format in which the personal data may be provided, and whether the personal data is encrypted. The access level of each group may also be entered. The user may add additional access groups via the Add Group button 1310.

Figure 11:
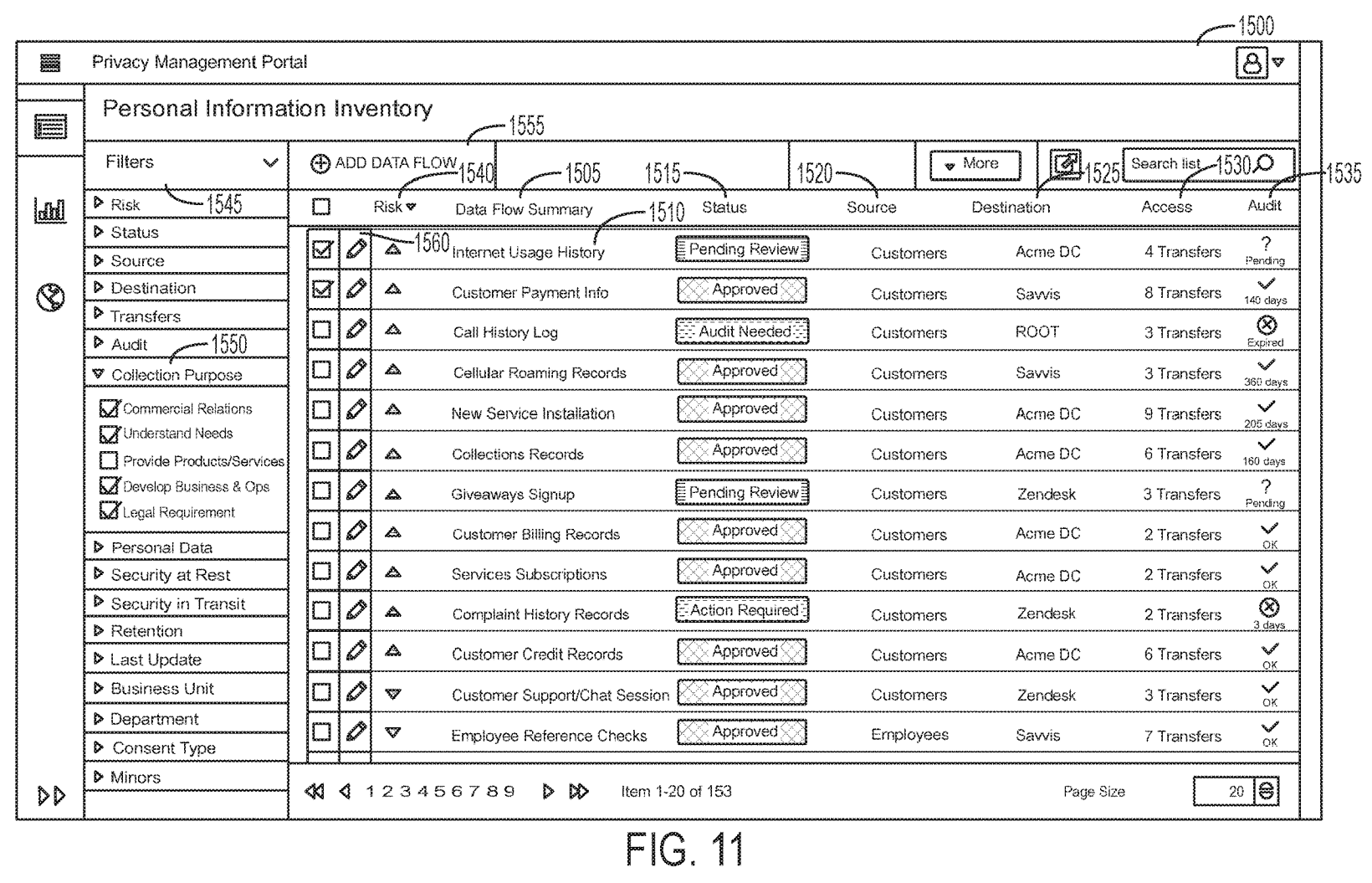

G: FIG. 11: Campaign Inventory Page

After new campaigns have been added, for example using the exemplary processes explained in regard to FIGS. 5-10, the users of the system may view their respective campaign or campaigns, depending on whether they have access to the campaign and the type of access system they have to the system. The chief privacy officer, or another privacy office representative, for example, may be the only user that may view all campaigns. A regulator may be limited to viewing only those campaigns that they have been tasked to review. A listing of all of the campaigns within the system may be viewed on, for example, inventory page 1500 (see below).

FIG. 11 depicts an example embodiment of an inventory page 1500 that may be generated by the system. The inventory page 1500 may be represented in a graphical user interface. Each of the graphical user interfaces (e.g., webpages, dialog boxes, etc.) presented in this application may be, in various embodiments, an HTML-based page capable of being displayed on a web browser (e.g., Firefox, Internet Explorer, Google Chrome, Opera, etc.), or any other computer-generated graphical user interface operable to display information, including information having interactive elements (e.g., an iOS, Mac OS, Android, Linux, or Microsoft Windows application). The webpage displaying the inventory page 1500 may include typical features such as a scroll-bar, menu items, as well as buttons for minimizing, maximizing, and closing the webpage. The inventory page 1500 may be accessible to the organization's chief privacy officer, or any other of the organization's personnel having the need, and/or permission, to view personal data.

Still referring to FIG. 11, inventory page 1500 may display one or more campaigns listed in the column heading Data Flow Summary 1505, as well as other information associated with each campaign, as described herein. Some of the exemplary listed campaigns include Internet Usage History 1510 (e.g., described above with respect to FIGS. 4-9), Customer Payment Information, Call History Log, Cellular Roaming Records, etc. A campaign may represent, for example, a business operation that the organization is engaged in and may require the use of personal data, which may include the personal data of a customer. In the campaign Internet Usage History 1510, for example, a marketing department may need customers' on-line browsing patterns to run certain types of analytics.

The inventory page 1500 may also display the status of each campaign, as indicated in column heading Status 1515. Exemplary statuses may include "Pending Review", which means the campaign has not been approved yet, "Approved," meaning the personal data associated with that campaign has been approved, "Audit Needed," which may indicate that a privacy audit of the personal data associated with the campaign is needed, and "Action Required," meaning that one or more individuals associated with the campaign must take some kind of action related to the campaign (e.g., completing missing information, responding to an outstanding message, etc.). In certain embodiments, the approval status of the various campaigns relates to approval by one or more third-party regulators as described herein.

The inventory page 1500 of FIG. 11 may list the "source" from which the personal data associated with a campaign originated, under the column heading "Source" 1520. As an example, the campaign "Internet Usage History" 1510 may include a customer's IP address or MAC address. For the example campaign "Employee Reference Checks", the source may be a particular employee.

The inventory page 1500 of FIG. 11 may also list the "destination" of the personal data associated with a particular campaign under the column heading Destination 1525. Personal data may be stored in any of a variety of places, for example, in one or more databases 140 that are maintained by a particular entity at a particular location. Different custodians may maintain one or more of the different storage devices. By way of example, referring to FIG. 10, the personal data associated with the Internet Usage History campaign 1510 may be stored in a repository located at the Toronto data center, and the repository may be controlled by the organization (e.g., Acme corporation) or another entity, such as a vendor of the organization that has been hired by the organization to analyze the customer's internet usage history. Alternatively, storage may be with a department within the organization (e.g., its marketing department).

On the inventory page 1500, the Access heading 1530 may show the number of transfers that the personal data associated with a campaign has undergone. This may, for example, indicate how many times the data has been accessed by one or more authorized individuals or systems.

The column with the heading Audit 1535 shows the status of any privacy audits associated with the campaign. Privacy audits may be pending, in which an audit has been initiated but yet to be completed. The audit column may also show for the associated campaign how many days have passed since a privacy audit was last conducted for that campaign. (e.g., 140 days, 360 days). If no audit for a campaign is currently required, an "OK" or some other type of indication of compliance (e.g., a "thumbs up" indicia) may be displayed for that campaign's audit status. The audit status, in various embodiments, may refer to whether the privacy campaign has been audited by a third-party regulator or other regulator as required by law or industry practice or guidelines. As discussed above, in any embodiment described herein, the system may be configured to substantially automatically adjust an audit schedule for one or more privacy campaigns associated with a particular organization based at least in part on that organization's privacy maturity.

The example inventory page 1500 may comprise a filter tool, indicated by Filters 1545, to display only the campaigns having certain information associated with them. For example, as shown in FIG. 11, under Collection Purpose 1550, checking the boxes "Commercial Relations," "Provide Products/Services", "Understand Needs," "Develop Business & Ops," and "Legal Requirement" will result the display under the Data Flow Summary 1505 of only the campaigns that meet those selected collection purpose requirements.

From example inventory page 1500, a user may also add a campaign by selecting (i.e., clicking on) Add Data Flow 1555. Once this selection has been made, the system initiates a routine (e.g., a wizard) to guide the user in a phase-by-phase manner through the process of creating a new campaign. An example of the multi-phase GUIs in which campaign data associated with the added privacy campaign may be input and associated with the privacy campaign record is described in FIGS. 5-10 above.

From the example inventory page 1500, a user may view the information associated with each campaign in more detail, or edit the information associated with each campaign. To do this, the user may, for example, click on or select the name of the campaign (i.e., click on Internet Usage History 1510). As another example, the user may select a button displayed on the screen indicating that the campaign data is editable (e.g., edit button 1560).

H. FIG. 12: Privacy Maturity Report Overview

FIG. 12 depicts an exemplary privacy maturity report overview 1600 that includes privacy maturity information for a plurality of Business Groups 1605 within an organization. As may be understood from this figure, the system is configured to display, via a GUI such as the GUI shown in FIG. 12, privacy maturity data for each of a plurality of business groups within an organization. As may be understood from this disclosure, in still other embodiments, the system may be configured to display privacy maturity data for a particular privacy campaign, a group of related privacy campaigns, an entire organization, a group of organizations or sub-groups, etc.

As shown in FIG. 12, the privacy maturity report overview 1600 includes a Maturity Score 1610 for each of the plurality of Business Groups 1605, as well as a Maturity Score delta A 1615, which may include, for example, a change in privacy maturity rating for the respective business group. In particular embodiments, the system is configured to determine a maturity score using the Privacy Compliance Measurement Module 300 described above. In various embodiments, the change in privacy maturity may represent, for example, a change in privacy maturity score since the most recent privacy maturity report was generated by the system. In other embodiments, the Maturity Score delta A 1615 may represent a change in privacy maturity score over any relevant period of time (e.g., day-to-day, etc.). As a particular example, the privacy maturity score of a group may increase following attendance of a privacy conference by members of the group.

In particular embodiments, the privacy maturity report overview 1600 includes an indication of whether there has been action taken by the system relating to a particular business group's privacy maturity, via an "Action Taken?" 1620 indicia. As may be understood from this figure and this disclosure, the system may be configured to substantially automatically modify one or more aspects of one or more particular privacy campaigns based at least in part on the privacy maturity of a particular business group associated with the one or more privacy campaigns. In such embodiments, the system is configured to notify one or more individuals, via the privacy maturity report overview 1600 interface that action has been taken. The one or more individuals may then, for example, request more detail about the privacy maturity report and action taken by selecting a suitable "More Detail" indicia 1625.

Figure 13:
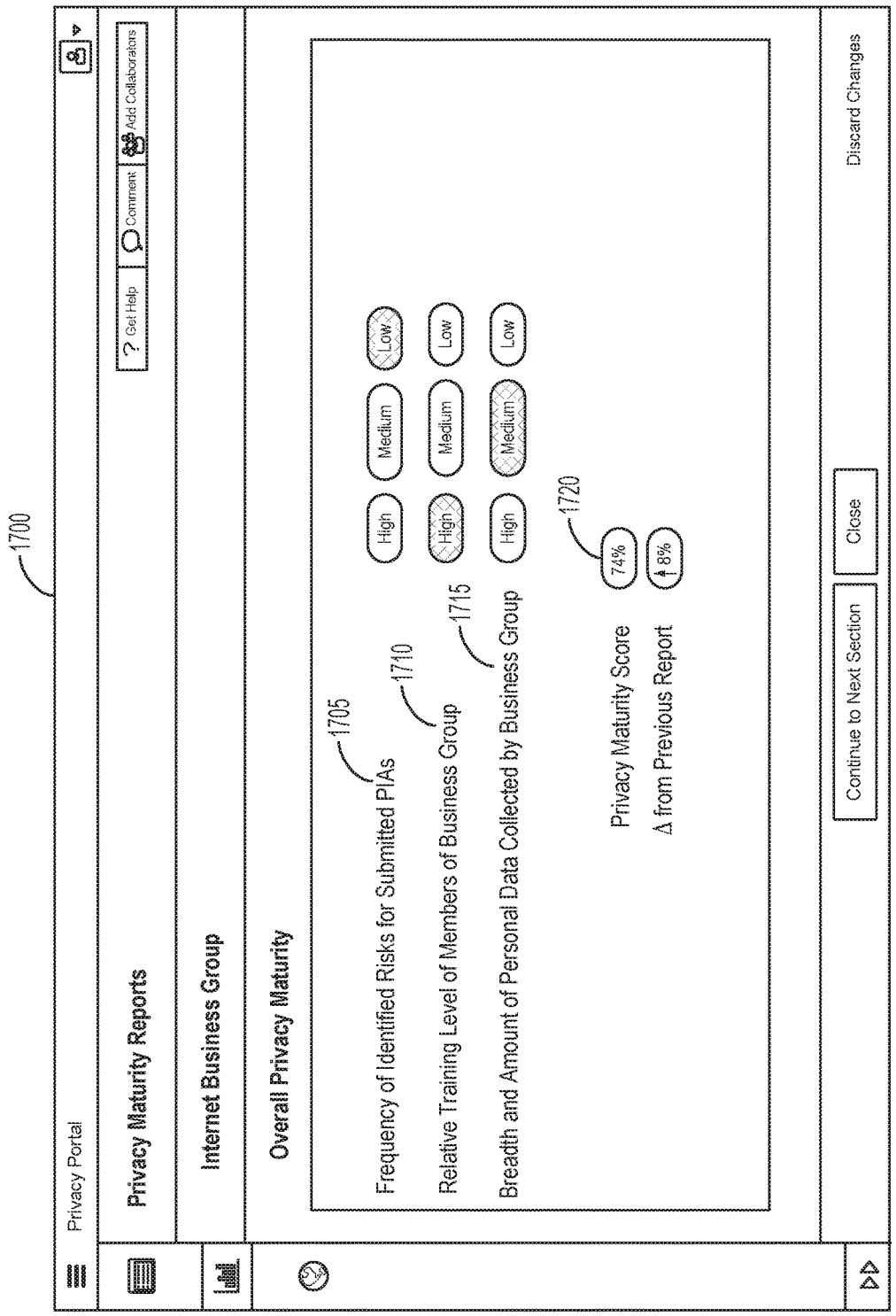

I. FIG. 13: Overall Privacy Maturity of a Particular Business Group

FIG. 13 depicts a privacy maturity report 1700 for a particular business group (e.g., the Internet Business Group) from FIG. 12. In the embodiment shown in this figure, the user interface may indicate relative weighting factors used in the determination of the privacy maturity score for the particular business group. These factors, described above with respect to the Privacy Compliance Measurement Module 300 may include, for example: (1) "Frequency of Identified Risks for Submitted PIAs" (Privacy Impact Assessments) 1705; (2) "Relative Training Level of Members of Business Group" 1710; and (3) "Breadth and Amount of Personal Data Collected by Business Group" 1715. As shown in this figure, the privacy maturity report 1700 may indicate whether these particular factors were "High," "Medium," or "Low." In particular embodiments, the report further includes the Privacy Maturity Score 1720 for the business group. In particular embodiments, the system is configured to determine the maturity score based on the three factors listed above. In some embodiments, the system is configured to use a weighted average, which may, for example, assign a particular weighting to each factor and determine an average maturity score based on whether the factor is determined by the system to be "High", "Medium", or "Low". In some embodiments, the system is configured to enable a user to provide customized weighting factors for each of these categories of factors. In other embodiments, the system is configured to enable a user to supply to the system a weighting factor for any suitable factor described herein or any other suitable factor when determining a privacy maturity score.

Alternative Embodiments

Various embodiments of the privacy compliance measurement systems described herein may include features in addition to those described above. Exemplary alternative embodiments are described below.

Automatic Implementation of Privacy Campaign, Project, or Other Activity for Business Groups with High Privacy Maturity In embodiments in which a privacy campaign (e.g., or project or other activity) requires third-party, privacy office, or other approval prior to implementation, the system may be configured to substantially automatically implement the privacy campaign in response to determining that the privacy maturity score of the business group initiating the privacy campaign exceeds a particular threshold. For example, in response to determining that a business group has a privacy maturity score above a certain threshold amount, the system may be configured to automatically initiate a new privacy campaign for the business group by beginning to collect the personal data as directed by the campaign. In this way, the system may be configured to conserve computing and other resources by avoiding a full audit of a privacy campaign prior to initiation for those business groups that are unlikely to initiate a privacy campaign that includes one or more issues or risks (e.g., because the business group has a relatively high privacy maturity).

Automatic Modification and Flagging of One or More Privacy Campaigns in Response to Determination that a Particular Business Group has Low Privacy Maturity In particular embodiments, such as those described above, the system may determine that a particular business group or other sub-group of an organization has a privacy maturity score below a threshold amount. In such embodiments, the system may be configured to substantially automatically modify one or more privacy campaigns associated with the particular business group to, for example: (1) increase a level of encryption used on stored personal data; (2) further limit access to stored personal data; (3) decrease an amount of time for which personal data is stored; and/or (4) take any other suitable additional precaution with respect to the personal data collected and stored as part of the one or more privacy campaigns to reduce a likelihood that the campaign may run afoul of one or more legal or industry standards for the collection and storage of personal data.

In various embodiments, in addition to automatically modifying the one or more privacy campaigns, the system may automatically flag the one or more privacy campaigns for further review or audit. In such embodiments, the system may be configured to: (1) maintain the modifications until the audit or review occurs; (2) receive an indication that the audit or review has been completed and the original aspects of the one or more privacy campaigns were sufficient to meet or exceed relevant legal or industry standards; and (3) in response to receiving the indication, reverting the modified aspects of the one or more privacy campaigns to their defaults.

Privacy Maturity Determination Based on Public Record and Other Data Scans

In any embodiment of the system described herein, a particular organization may undertake one or more privacy campaigns, processing activities, or other activities that collect, store, and otherwise process data (e.g., personal data). These processing activities may be undertaken by particular groups within the particular organization (e.g., sub groups, groups of individuals, etc.).

In light of the above, the system may use one or more techniques described herein in combination with one or more additional suitable factors, to electronically calculate or otherwise determine a privacy maturity of a particular group of individuals (e.g., organization) within an organization.

In various embodiments, the system may, for example, determine a privacy maturity of a particular group of individuals based on any technique described herein in addition to, for example: (1) the nature of the sensitive information collected as part of a processing activity undertaken by the group of individuals; (2) the location in which the information is stored as part of such a processing activity (e.g., as part of a piece of computer software published by the group of individuals) (3) the number of individuals who have access to the information collected and/or stored by such a processing activity; (4) the length of time that the data will be stored by (5) the individuals whose sensitive information will be stored; (6) the country of residence of the individuals whose sensitive information will be stored; and/or (7) any other suitable factor related to the collection, processing and/or storage of data (e.g., personal data) by any processing activity undertaken by the group of individuals.

In particular embodiments, the system may, for example, be configured to calculate a privacy maturity score for a particular individual, group of individuals, departments, etc. within an organization. The system may then, in various embodiments, use the privacy maturity score in order to calculate a risk rating or other risk score for a particular piece of software or other service initiated by the group of individuals.

In various embodiments, the system may, for example: (1) analyze one or more pieces of publicly available data associated with the one or more individuals that make up the group for which privacy maturity is being evaluated: and (2) calculate the privacy maturity score for the group (e.g., business unit) based on the analyzed one or more pieces of publicly available data. In particular embodiments, the system is configured to analyze one or more pieces of the group's published applications of software available to one or more customers to detect one or more privacy disclaimers associated with the published applications. The system may then, for example, be configured to use one or more text matching techniques to determine whether the one or more privacy disclaimers contain one or more pieces of language required by one or more prevailing industry or legal requirements related to data privacy. The system may, for example, be configured to assign a relatively high privacy maturity score to a group whose published software includes required privacy disclaimers, and configured to assign a relatively low privacy maturity score to group whose software does not include such disclaimers.

In another example, the system may be configured to analyze one or more websites associated with the group (e.g., one or more websites that host one or more pieces of computer code or software made available by the group) for one or more privacy notices, one or more blog posts, one or more preference centers, and/or one or more control centers. The system may, for example, calculate the privacy maturity score based at least in part on a presence of one or more suitable privacy notices, one or more contents of one or more blog posts on the group site (e.g., whether the group site has one or more blog posts directed toward user privacy), a presence of one or more preference or control centers that enable visitors to the site to opt in or out of certain data collection policies (e.g., cookie policies, etc.), etc.

In particular other embodiments, the system may be configured to determine whether the particular group (e.g., or any of its members) holds one or more security certifications. The one or more security certifications may include, for example: (1) system and organization control (SOC); (2) International Organization for Standardization (ISO); (3) Health Insurance Portability and Accountability ACT (HIPPA); (4) etc. In various embodiments, the system is configured to access one or more public databases of security certifications to determine whether the particular group or any suitable number of its individual members holds any particular certification. The system may then determine the privacy maturity score based on whether the group or its members hold one or more security certifications (e.g., the system may calculate a relatively higher score depending on one or more particular security certifications held by members of the group or business unit). The system may be further configured to scan a group website for an indication of the one or more security certifications.

In various embodiments, the system may be further configured to analyze on or more credit bureau databases, one or more government or industry certification body databases, one or more vendor membership databases, or other suitable databases to determine whether the particular group belongs to or is associated with one or more organizations that may indicate a particular awareness and attention to one or more privacy issues (e.g., one or more issues related to the collection, storage, and/or processing of personal data).

In still other embodiments, the system is configured to analyze one or more social networking sites (e.g., LinkedIn, Facebook, etc.) and/or one or more business related job sites (e.g., one or more job-posting sites, one or more corporate websites, etc.). The system may, for example, use social networking and other data to identify one or more employee titles of the business unit, one or more job roles for one or more employees in the group, one or more job postings for the for the business unit (e.g., group), etc. The system may then analyze the one or more job titles, postings, listings, roles, etc. to determine whether the group has or is seeking one or more employees that have a role associated with data privacy or other privacy concerns. In this way, the system may determine whether the group is particularly focused on privacy or other related activities. The system may then calculate a privacy maturity score based on such a determination (e.g., a vendor that has one or more employees whose roles or titles are related to privacy may receive a relatively higher privacy awareness score).

In particular embodiments, the system may be configured to calculate the privacy maturity score using one or more additional factors such as, for example: (1) public information associated with one or more events that the group or its members may be attending; (2) public information associated with one or more conferences that the group or its members have participated in or are planning to participate in; (3) etc. In some embodiments, the system may calculate a privacy maturity score based at least in part on one or more government relationships with the group. For example, the system may be configured to calculate a relatively high privacy maturity score for a group that has one or more contracts with one or more government entities (e.g., because an existence of such a contract may indicate that the group has passed one or more vetting requirements imposed by the one or more government entities).

In any embodiment described herein, the system may be configured to assign, identify, and/or determine a weighting factor for each of a plurality of factors used to determine a privacy maturity score for a particular entity, group, organization, or plurality of individuals. For example, when calculating the privacy maturity score, the system may assign a first weighting factor to whether the group has one or more suitable privacy notices posted on the vendor website, a second weighting factor to whether the group has one or more particular security certifications, etc. The system may, for example, assign one or more weighting factors using any suitable technique described herein with relation to risk rating determination. In some embodiments, the system may be configured to receive the one or more weighting factors (e.g., from a user). In other embodiments, the system may be configured to determine the one or more weighting factors based at least in part on a type of the factor.

In any embodiment described herein, the system may be configured to determine an overall risk rating for a particular group (e.g., particular piece of vendor software) based in part on the privacy maturity score. In other embodiments, the system may be configured to determine an overall risk rating for a particular group based on the privacy maturity rating in combination with one or more additional factors (e.g., one or more additional risk factors described herein). In any such embodiment, the system may assign one or more weighting factors or relative risk ratings to each of the privacy maturity score and other risk factors when calculating an overall risk rating. The system may then be configured to provide the risk score for the group, software, and/or service for use in calculating a risk of undertaking any particular processing activity that the group may undertake (e.g., in any suitable manner described herein).

CONCLUSION

Although embodiments above are described in reference to various privacy compliance measurement systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and assessing risk of privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for measuring compliance of a particular organization with one or more requirements associated with one or more pieces of computer code originating from the particular organization, the method comprising:

electronically obtaining, by one or more processors, each of the one or more pieces of computer code;

automatically electronically analyzing each of the one or more pieces of computer code to determine one or more privacy-related attributes of each of the one or more pieces of computer code, each of the privacy-related attributes indicating one or more types of privacy campaign data that the computer code collects or accesses;

in response to determining that the computer code has a particular one of the one or more privacy-related attributes, executing the steps of (i) electronically displaying one or more prompts to a first individual requesting that the first individual input information regarding the particular privacy-related attribute; (ii) receiving input information from the first individual regarding the particular privacy-related attribute; and (iii) communicating the information regarding the particular privacy-related attribute to one or more second individuals for use in conducting a privacy assessment of the computer code;

scanning publicly available data sources for data records associated with the particular organization, the data records comprising one or more public record databases comprising one or more social network websites and one or more additional data records selected from the group consisting of: one or more privacy disclaimers corresponding with the one or more pieces of computer code; and one or more privacy notices corresponding to one or more websites corresponding to the particular organization;

determining, by one or more processors, based at least in part on the one or more types of privacy campaign data that the computer code collects or accesses and the publicly available data sources, a privacy maturity score for the particular organization indicating compliance of the organization with one or more privacy-related requirements of the one or more pieces of computer code; and displaying, by one or more processors, the privacy maturity score on a display screen associated with a computing device; and marking at least one of the one or more pieces of computer code for modification based at least in part on the privacy maturity score.

2. The computer-implemented data processing method of claim 1, wherein the data records comprise the one or more privacy disclaimers corresponding with the one or more pieces of computer code.

3. The computer-implemented data processing method of claim 1, wherein the data records comprise the one or more privacy notices associated with one or more websites associated with the particular organization.

4. The computer-implemented data processing method of claim 3, wherein the method further comprises:

analyzing a website of the one or more websites associated with the particular organization to identify the one or more privacy notices;

analyzing one or more contents of the one or more privacy notices; and electronically calculating the privacy maturity score by electronically calculating the privacy maturity score based on the one or more contents of the one or more privacy notices.

5. The computer-implemented data processing method of claim 4, wherein:

the method further comprises:

analyzing the one or more websites associated with the particular organization;

identifying one or more industry certifications associated with the particular organization based on the analysis of the one or more websites; and electronically calculating the privacy maturity score by electronically calculating the privacy maturity score based on the identification of the one or more industry certifications.

6. The computer-implemented data processing method of claim 1, wherein:

the method further comprises:

analyzing one or more public record databases associated with the particular organization;

identifying one or more industry certifications associated with the particular organization from the one or more public record databases; and electronically calculating the privacy maturity score by electronically calculating the privacy maturity score based on the identification of the one or more industry certifications.

7. The computer-implemented data processing method of claim 6, wherein: analyzing the one or more public record databases comprises analyzing the one or more social networking websites associated with the particular organization.

8. The computer-implemented data processing method of claim 7, wherein:

the analysis of the data records comprises analysis of one or more business related job sites associated with the particular organization; and the method further comprises:

determining one or more employee titles, employee roles, and available job posts corresponding to the particular organization based on the analysis of the one or more social networking websites and the one or more business related job sites; and calculating the privacy maturity score based on the one or more employee titles, employee roles, and available job posts.

9. The computer-implemented data processing method of claim 1, wherein the method further comprises receiving one or more privacy impact assessments associated with each of the one or more pieces of computer code; and determining the privacy maturity score for the particular organization further comprises determining the privacy maturity score based at least in part on the one or more privacy impact assessments.

10. The computer-implemented data processing method of claim 9, wherein:

the one or more privacy impact assessments are one or more privacy impact assessments performed prior to execution of the one or more pieces of computer code as part of a privacy campaign.

11. A non-transitory computer-readable medium storing computer-executable instructions for measuring compliance of a plurality of individuals with one or more privacy-related requirements, the method comprising:

electronically obtaining, by one or more processors, one or more pieces of computer code from one or more websites associated with the plurality of individuals;

automatically electronically analyzing each of the one or more pieces of computer code to determine one or more privacy-related attributes of each of the one or more pieces of computer code, each of the privacy-related attributes indicating one or more types of privacy campaign data that the computer code collects or accesses;

in response to determining that the computer code has a particular one of the one or more privacy-related attributes, executing the steps of (i) electronically displaying one or more prompts to a first individual requesting that the first individual input information regarding the particular privacy-related attribute; (ii) receiving input information from the first individual regarding the particular privacy-related attribute; and (iii) communicating the information regarding the particular privacy-related attribute to one or more second individuals for use in conducting a privacy assessment of the computer code;

analyzing, by one or more processors, for at least one of the plurality of individuals, pieces of publicly available data associated with the at least one of the plurality of individuals, the pieces of publicly available data comprising one or more public record databases comprising one or more social network websites and one or more additional pieces of publicly available data selected from the group consisting of: one or more privacy disclaimers corresponding to the one or more pieces of computer code; and one or more privacy notices corresponding to the one or more websites associated with the plurality of individuals;

determining, by one or more processors, based at least in part on the one or more types of privacy campaign data that the computer code collects or accesses and the pieces of publicly available data, a privacy maturity score for the plurality of individuals indicating compliance of the plurality of individuals with one or more privacy-related requirements;

displaying, by one or more processors, the privacy maturity score on a display screen associated with a computing device; and marking at least one of the one or more pieces of computer code for modification based at least in part on the privacy maturity score.

12. The non-transitory computer-readable medium of claim 11, wherein the one or more websites associated the plurality of individuals comprise one or more websites that host the one or more pieces of computer code.

13. The non-transitory computer-readable medium of claim 11, wherein:
the pieces of publicly available data comprise the one or more privacy disclaimers associated with the one or more pieces of computer code; and
the one or more privacy disclaimers associated with the one or more pieces of computer code comprise one or more privacy disclaimers associated with one or more software applications published by the plurality of individuals that are available to one or more customers of the plurality of individuals.

14. The non-transitory computer-readable medium of claim 11, wherein:
analyzing the pieces of publicly available data comprises analyzing one or more credit bureau databases; and
the non-transitory computer-readable medium further stores computer-executable instructions for:
accessing the one or more credit bureau databases; and
determining one or more pieces of credit data associated with an organization to which the plurality of individuals belong.

15. The non-transitory computer-readable medium of claim 11, wherein:
the pieces of publicly available data comprise the one or more privacy disclaimers associated with the one or more pieces of computer code; and
the non-transitory computer-readable medium further stores computer-executable instructions for:
analyzing one or more contents of the one or more privacy disclaimers; and
calculating the privacy maturity score based at least in part on the one or more contents of the one or more privacy disclaimers.

16. The non-transitory computer-readable medium of claim 15, wherein the non-transitory computer-readable medium further stores computer-executable instructions for:
determining whether the one or more contents of the one or more privacy disclaimers comprise one or more pieces of language required by one or more regulations;
in response to determining that the one or more contents of the one or more privacy disclaimers comprise the one or more pieces of language, calculating a first privacy awareness score; and
in response to determining that that the one or more contents of the one or more privacy disclaimers do not comprise the one or more pieces of language, calculating a second privacy awareness score.

17. The non-transitory computer-readable medium of claim 11, wherein:
the pieces of publicly available data comprise one or more security certifications associated with the plurality of individuals;
the non-transitory computer-readable medium further stores computer-executable instructions for:
determining whether the at least one of the plurality of individuals holds a particular security certification based on the pieces of publicly available data; and
calculating the privacy maturity score based on whether the at least one of the plurality of individuals holds the particular security certification.

18. The non-transitory computer-readable medium of claim 11, wherein:
the non-transitory computer-readable medium further stores computer-executable instructions for:
analyzing a website associated with the one or more pieces of computer code to identify the one or more privacy notices;
analyzing one or more contents of the one or more privacy notices; and determining the privacy maturity score by electronically calculating the privacy maturity score based on the one or more contents of the one or more privacy notices; and
the pieces of publicly available data comprise the one or more privacy notices associated with the one or more websites corresponding to the plurality of individuals.

19. The non-transitory computer-readable medium of claim 11, wherein the pieces of publicly available data comprise the one or more privacy notices associated with the one or more websites associated with the plurality of individuals.

* * * * *

UNITED STATES PATENT AND TRADEMARK OFFICE
CERTIFICATE OF CORRECTION

PATENT NO. : 10,445,526 B2  
APPLICATION NO. : 16/363454  
DATED : October 15, 2019  
INVENTOR(S) : Kabir A. Barday et al.

Page 1 of 1

It is certified that error appears in the above-identified patent and that said Letters Patent is hereby corrected as shown below:

In the Specification

In Column 21, Lines 54 and 62, 'delta A' should read -delta Δ-.

Signed and Sealed this  
Twenty-first Day of January, 2020

Andrei Iancu  
*Director of the United States Patent and Trademark Office*